(12) United States Patent
Nakahara

(10) Patent No.: US 7,995,433 B2
(45) Date of Patent: Aug. 9, 2011

(54) OPTICAL HEAD APPARATUS AND OPTICAL DISC APPARATUS

(75) Inventor: Hironori Nakahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 13 days.

(21) Appl. No.: 12/601,144

(22) PCT Filed: Mar. 5, 2008

(86) PCT No.: PCT/JP2008/053933
§ 371 (c)(1),
(2), (4) Date: Nov. 20, 2009

(87) PCT Pub. No.: WO2008/146511
PCT Pub. Date: Dec. 4, 2008

(65) Prior Publication Data
US 2010/0149936 A1    Jun. 17, 2010

(30) Foreign Application Priority Data
May 30, 2007 (JP) .................................. 2007-142895

(51) Int. Cl.
*G11B 7/00* (2006.01)
(52) U.S. Cl. .................... 369/44.37; 369/94; 369/112.05
(58) Field of Classification Search ............... 369/44.37, 369/44.41, 44.23, 112.01, 112.05, 112.07, 369/94
See application file for complete search history.

(56) References Cited

U.S. PATENT DOCUMENTS

| | | | |
|---|---|---|---|
| 2002/0181343 A1* | 12/2002 | Hayashi et al. | ............. 369/44.37 |
| 2005/0286360 A1 | 12/2005 | Nakao | |
| 2007/0223349 A1* | 9/2007 | Shimada et al. | ......... 369/112.16 |
| 2008/0017481 A1 | 1/2008 | Benninga et al. | |
| 2008/0056103 A1* | 3/2008 | Kawasaki et al. | ............. 369/116 |
| 2008/0170481 A1 | 7/2008 | Ogata | |
| 2008/0310283 A1* | 12/2008 | De Wit et al. | ............. 369/112.05 |
| 2009/0028035 A1* | 1/2009 | Sano et al. | ............... 369/112.03 |

FOREIGN PATENT DOCUMENTS

| | | |
|---|---|---|
| JP | 61-94246 A | 5/1986 |
| JP | 8-163095 A | 6/1996 |
| JP | 2005-346882 A | 12/2005 |
| JP | 2007-73084 A | 3/2007 |
| WO | WO 2006/093212 A1 | 9/2006 |

* cited by examiner

*Primary Examiner* — Thang V Tran
(74) *Attorney, Agent, or Firm* — Birch, Stewart, Kolasch & Birch, LLP

(57) ABSTRACT

In an optical head apparatus and an optical disc apparatus which can reduce influence of interlayer stray light on a differential push-pull signal without making the configuration complicated, $U_y=T_y \times N_1$ is satisfied, where $T_y$ denotes a length in the y-direction of one period of an interference fringe which is formed on the photodetector 9 by reflected light of the zero-order diffracted light by an information recording surface other than the access-target information recording surface, reflected light of the positive-first-order diffracted light by the information recording surface other than the access-target information recording surface, and reflected light of the negative-first-order diffracted light by the information recording surface other than the access-target information recording surface, $N_1$ denotes a positive integer, and $U_y$ denotes each length in the y-direction of the divisional light-receiving elements 9e, 9f, 9g, and 9h. Furthermore, $V_y = (T_y/2) \times \{N_2 - (\frac{1}{2})\}$ is satisfied, where $N_2$ denotes a positive integer and $V_y$ denotes a distance to a division line of the divisional light-receiving elements 9g and 9h and a distance to a division line of the divisional light-receiving elements 9e and 9f, from a center of a main-beam light-receiving unit 9M.

7 Claims, 17 Drawing Sheets

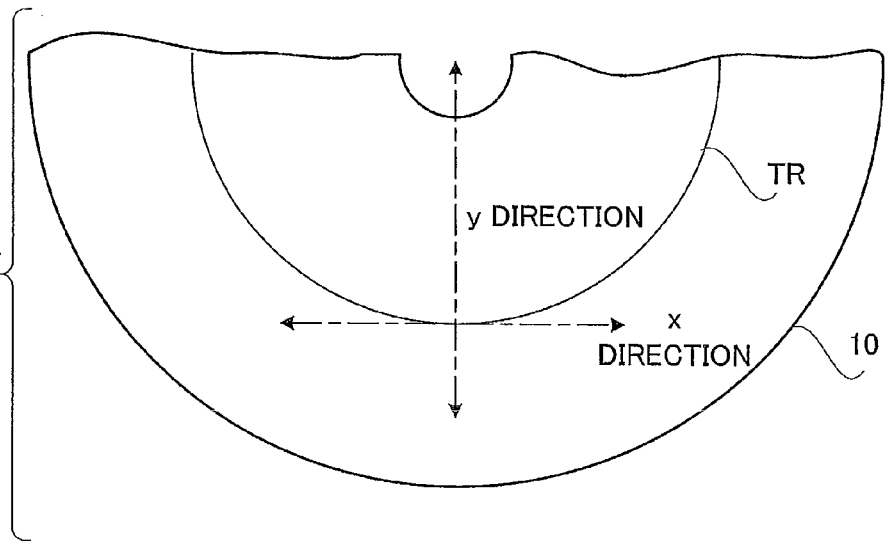
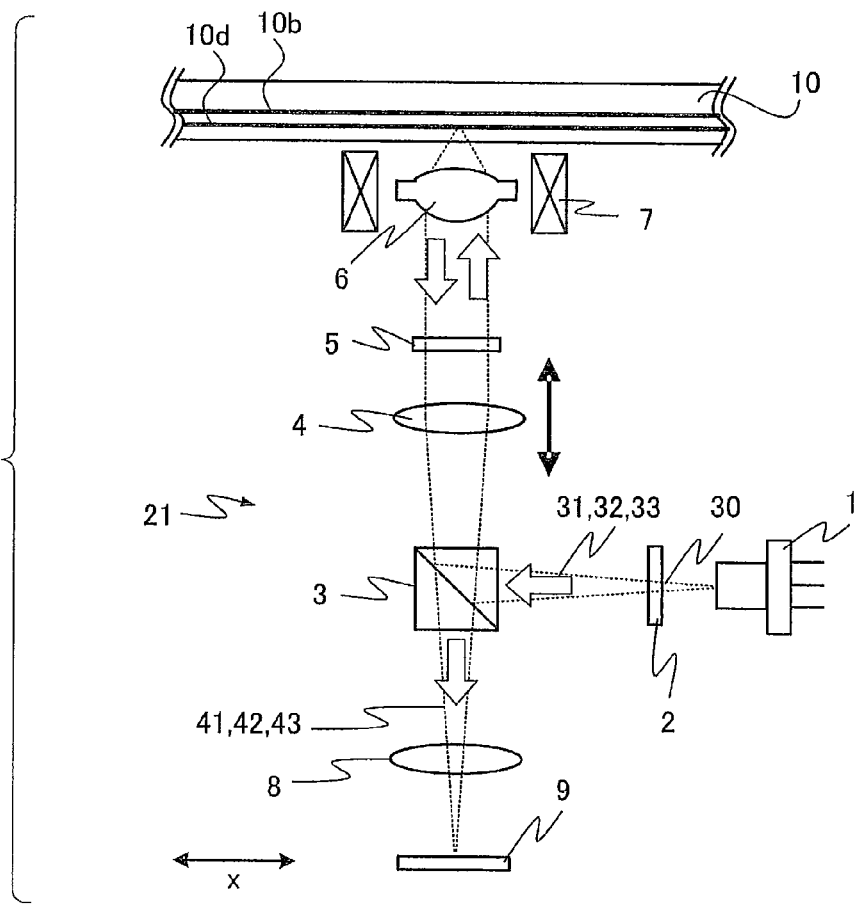

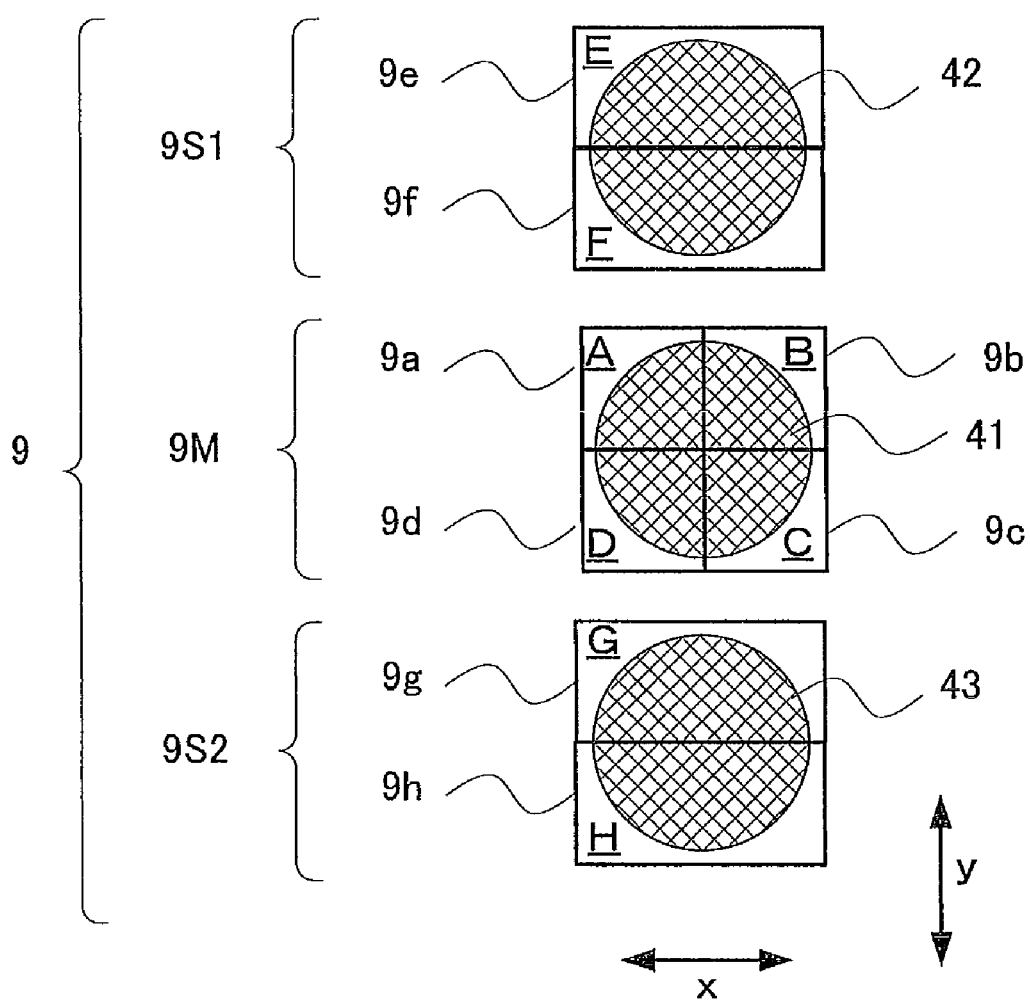

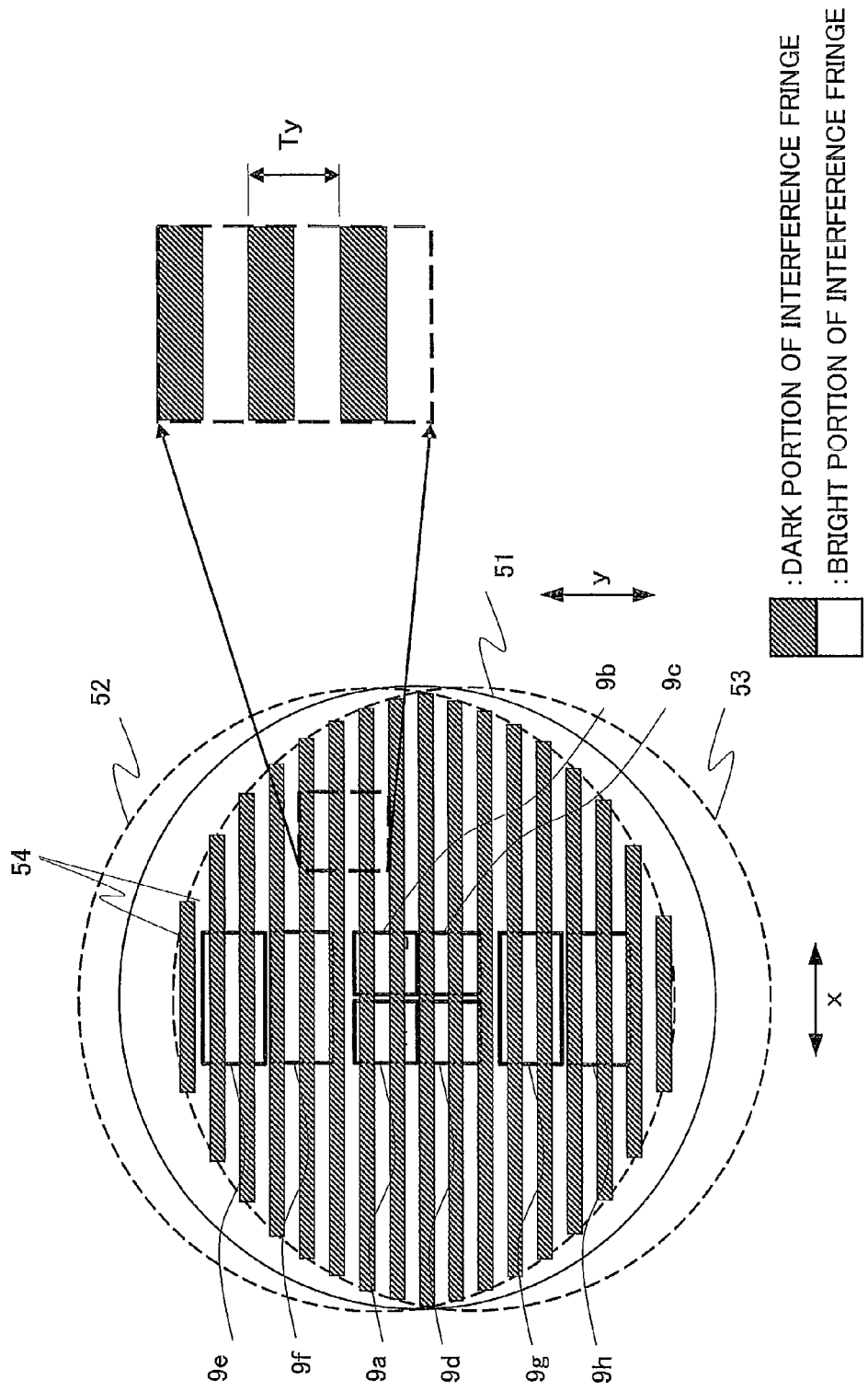

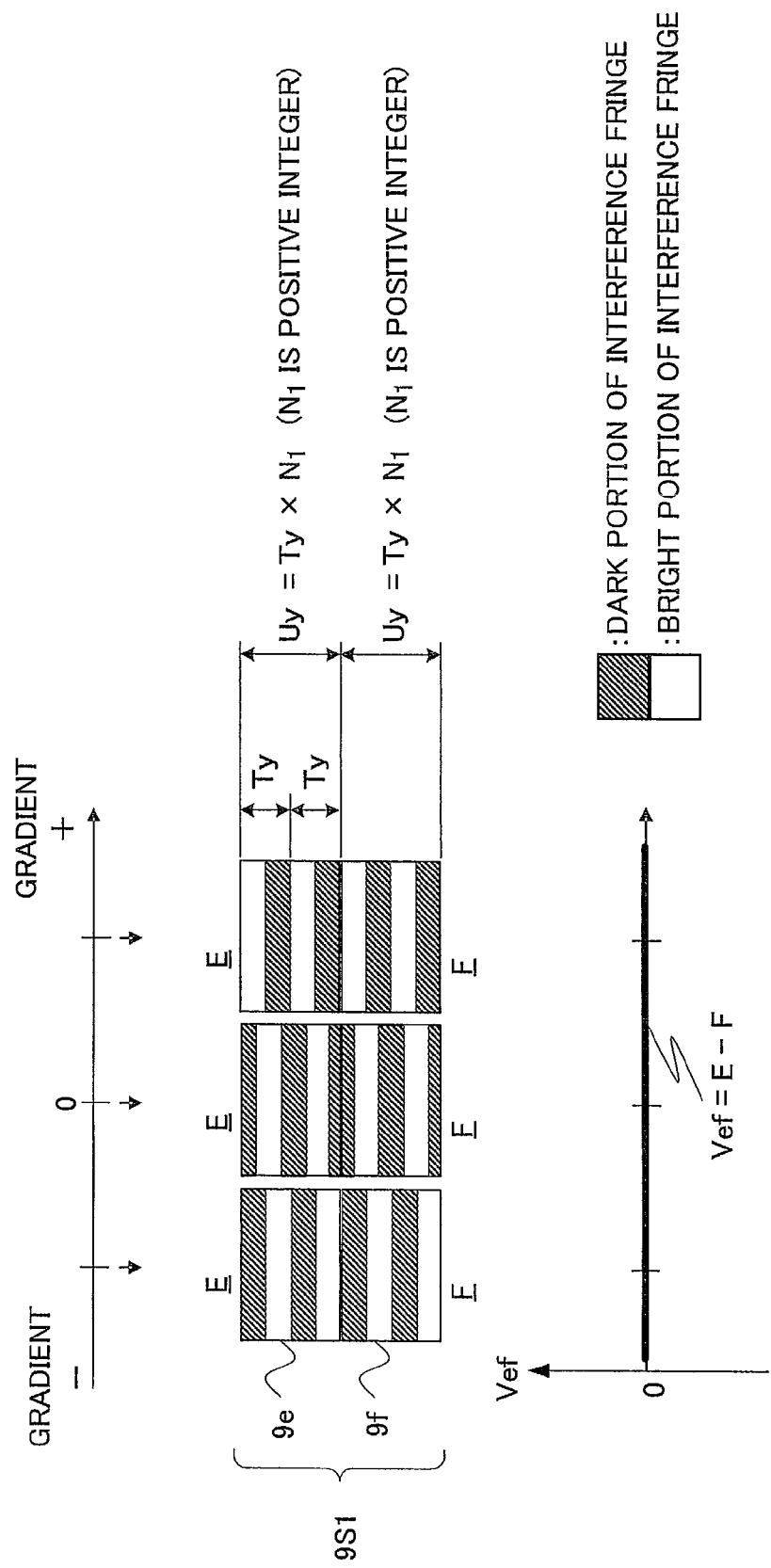

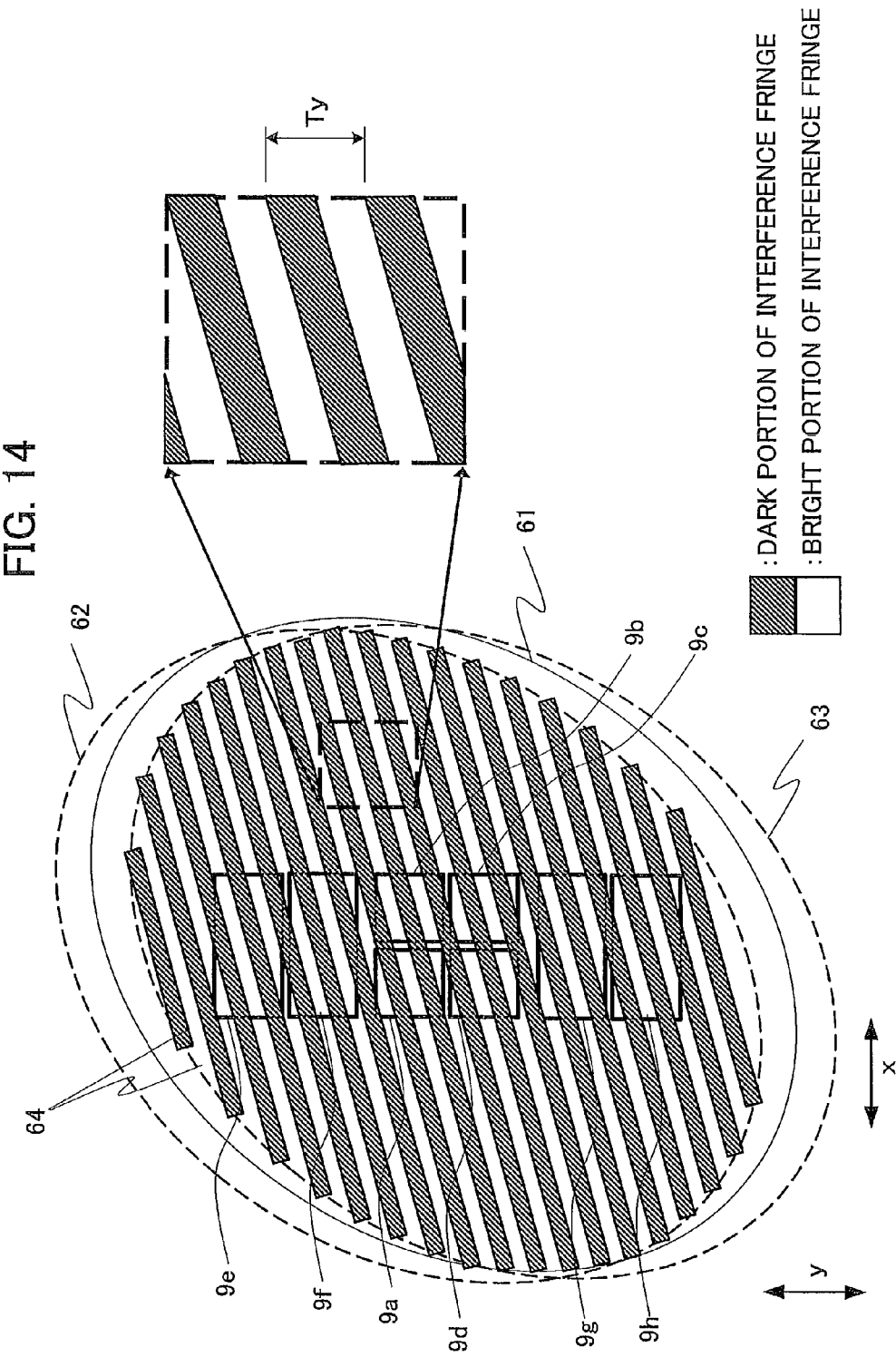

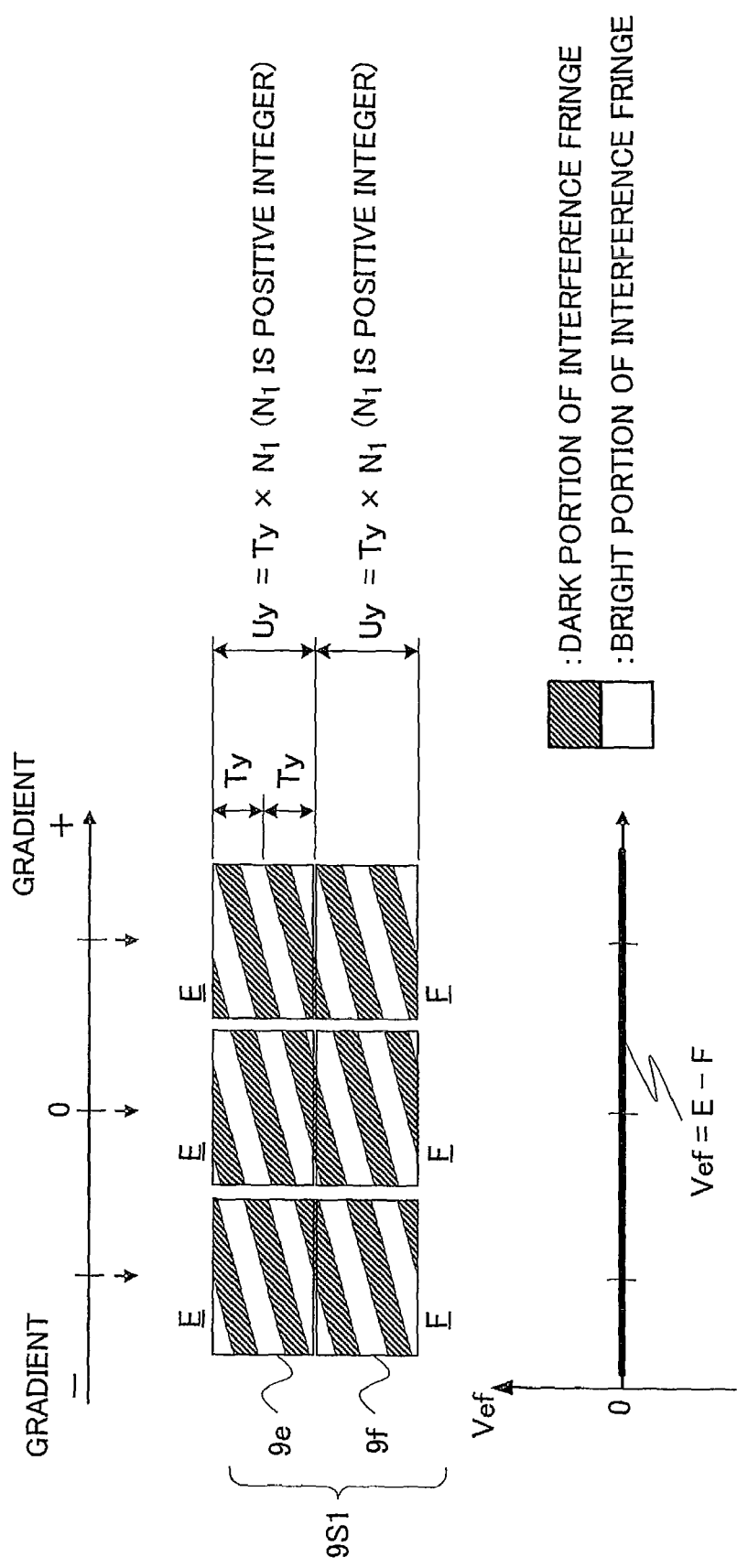

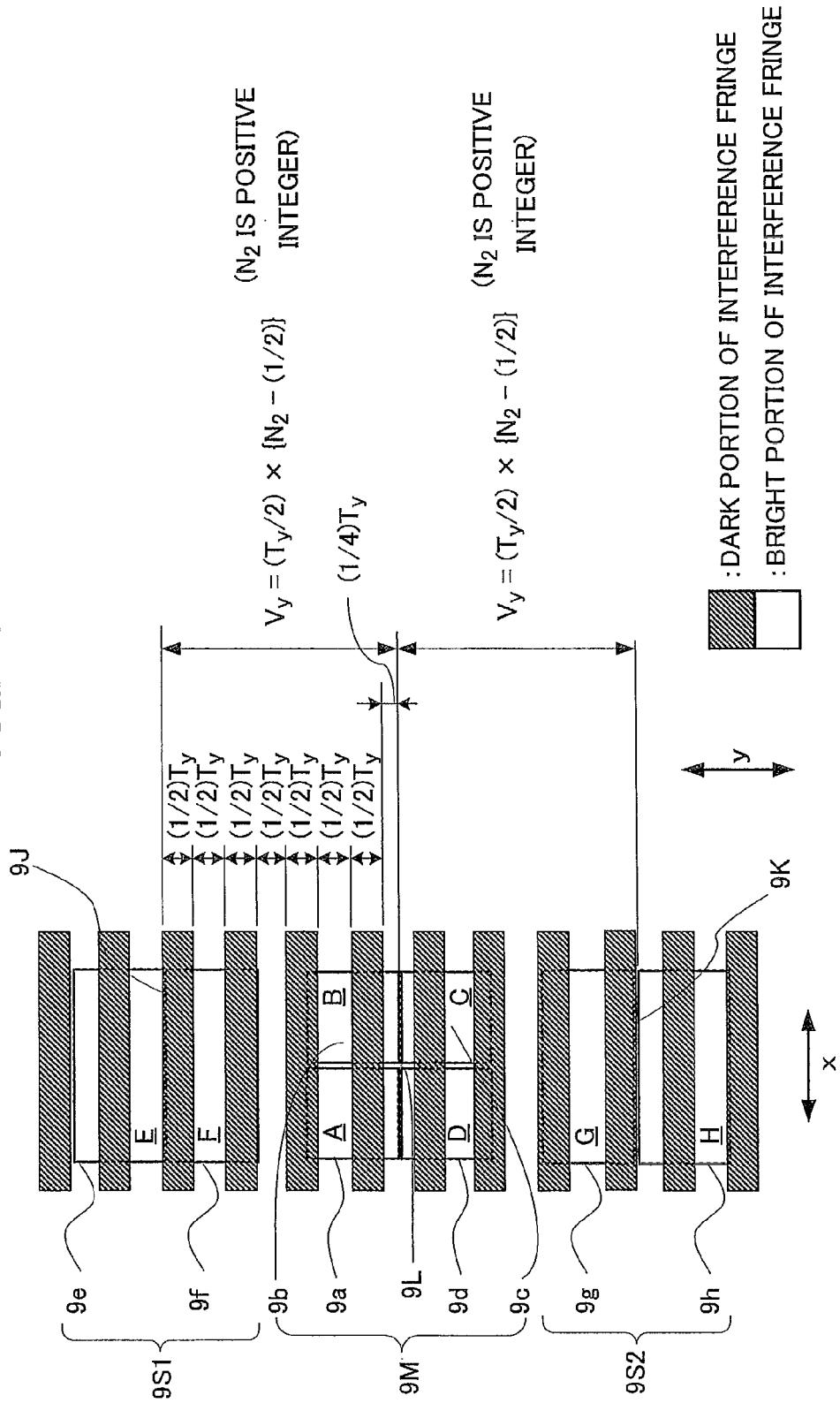

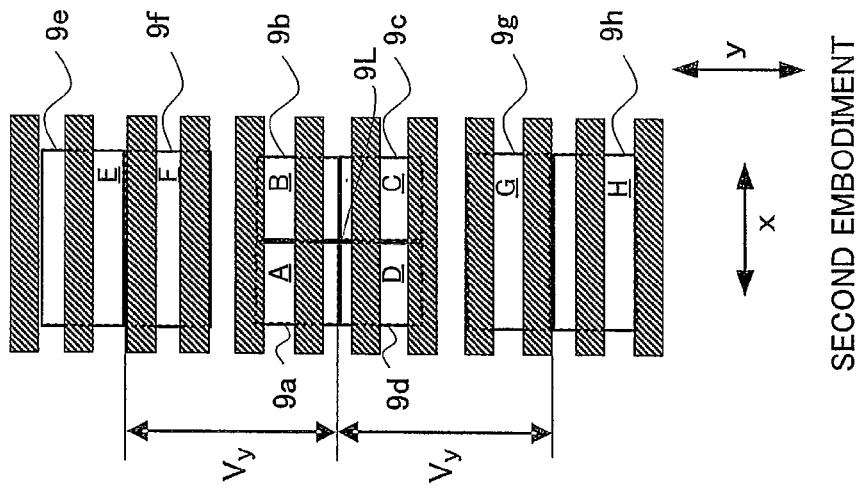
FIG. 17A EXAMPLE FOR COMPARISON C1
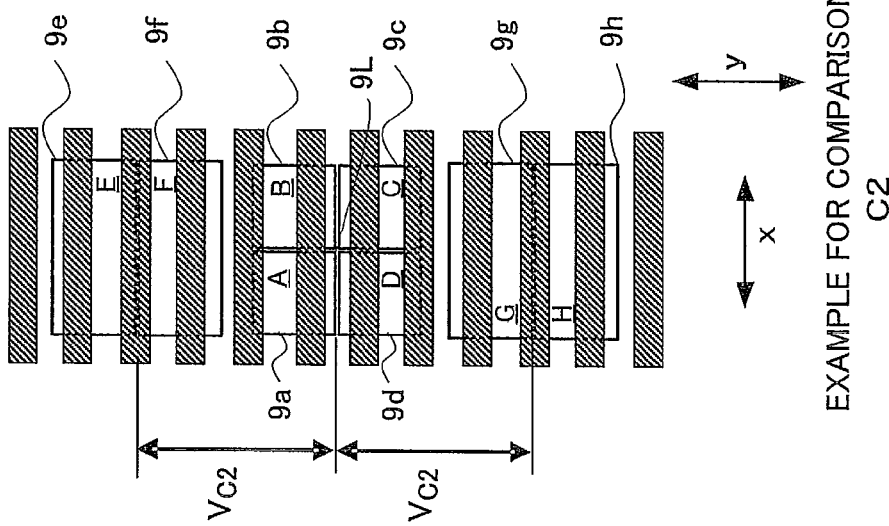
FIG. 17B EXAMPLE FOR COMPARISON C2
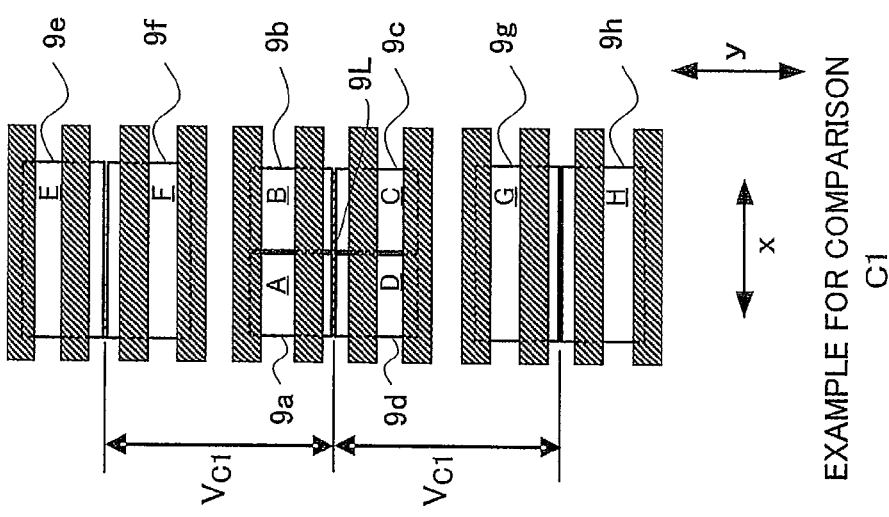
FIG. 17C SECOND EMBODIMENT

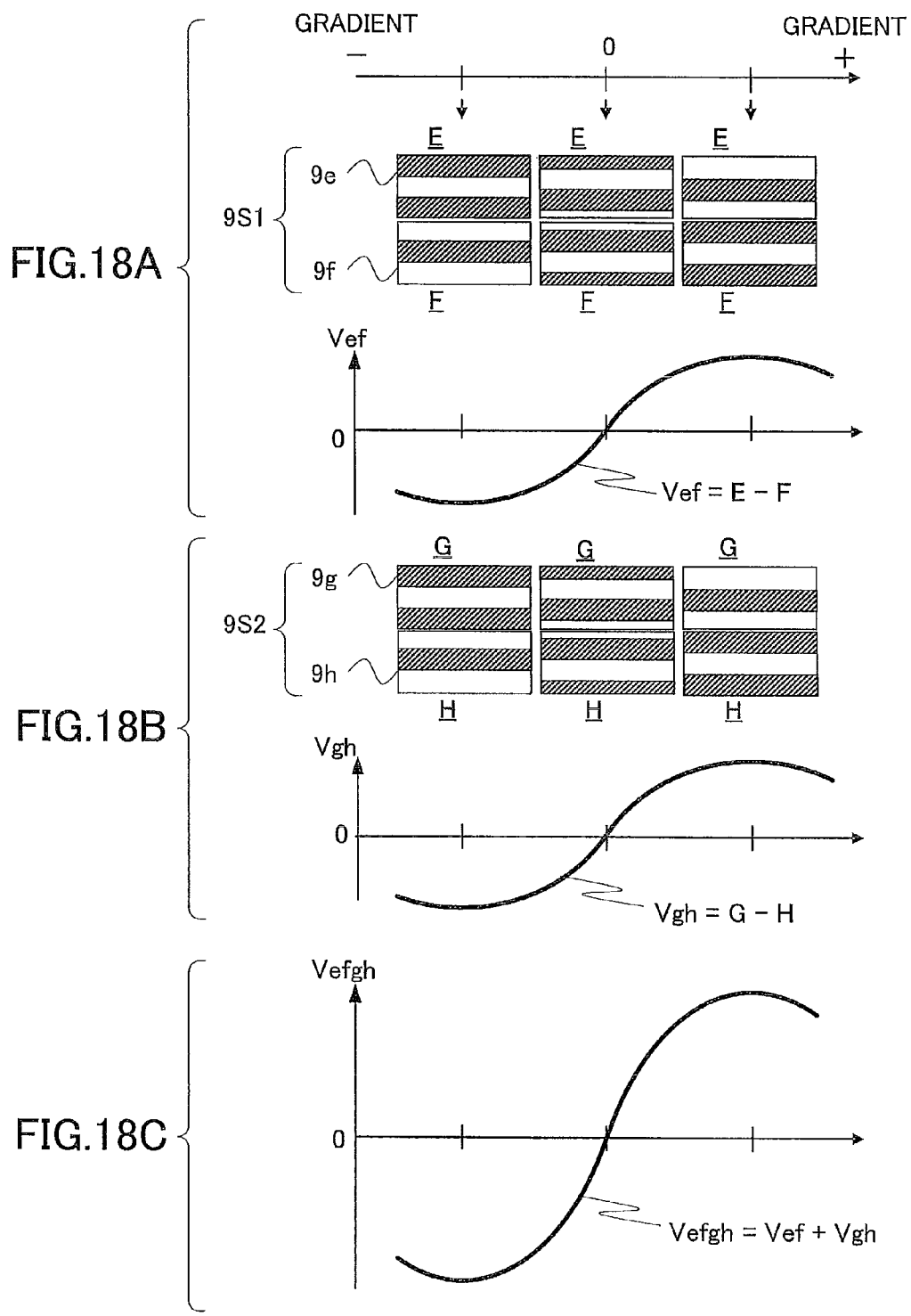

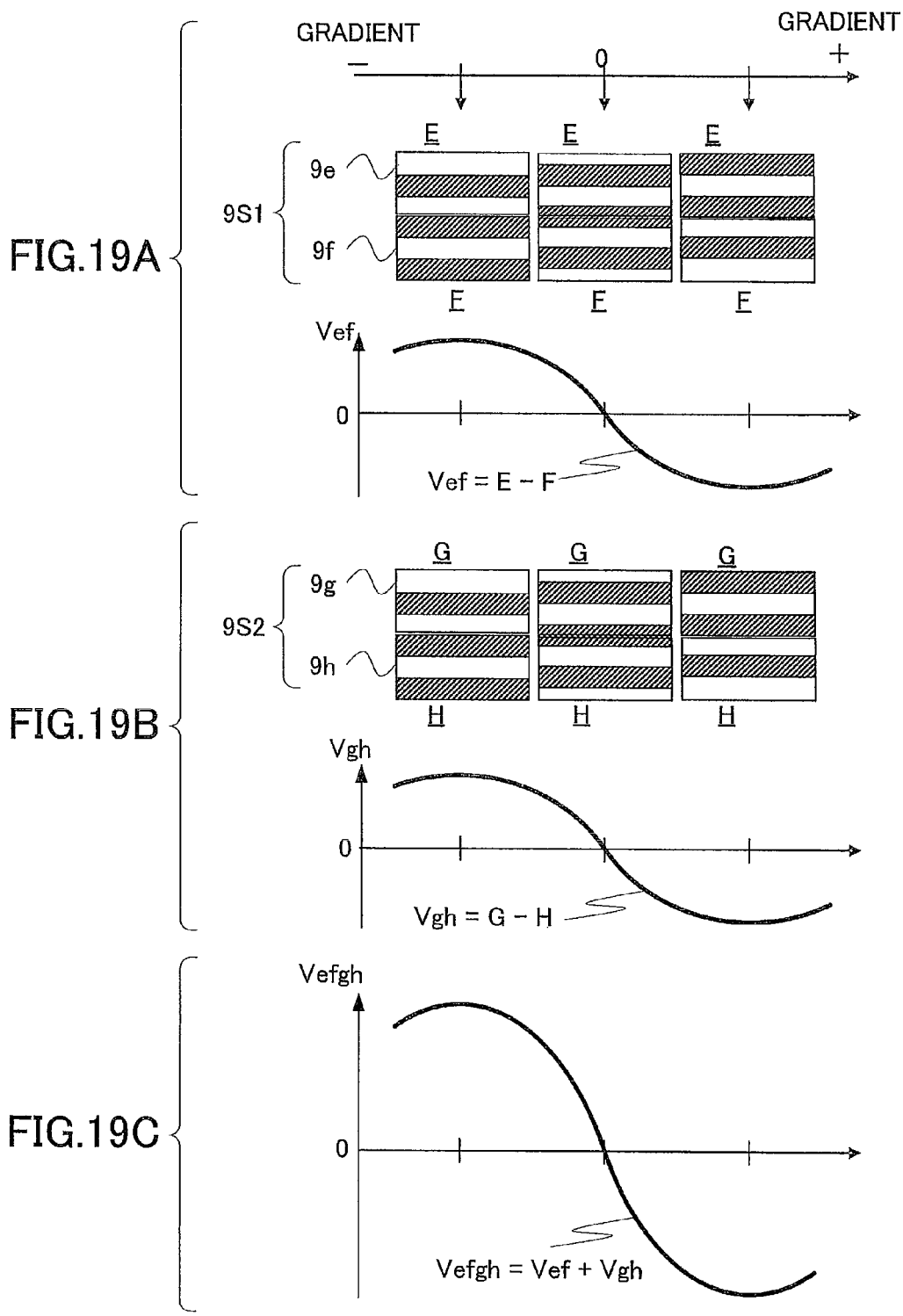

US 7,995,433 B2

OPTICAL HEAD APPARATUS AND OPTICAL DISC APPARATUS

TECHNICAL FIELD

The present invention relates to an optical head apparatus irradiating a multi-layer optical disc having a plurality of information recording surfaces with laser light and detecting reflected light and an optical disc apparatus having the optical head apparatus.

BACKGROUND ART

As an optical disc 10, such as a CD (compact disc), DVD (digital versatile disc), and BD (Blu-ray disc), there is a playback-only optical disc having a spiral recording track TR which is formed by rows of pits TB with a track pitch TP on an information recording surface as shown in FIG. 1, and there is a write-once or rewritable type optical disc having a spiral recording track TR onto which recording marks TM are written with a track pitch TP on an information recording surface as shown in FIG. 2.

An optical disc apparatus has an optical head apparatus irradiating the optical disc 10 with laser light and detecting reflected light of the laser light and a servo circuit causing a light-collected spot at which the light is collected on the information recording surface of the optical disc to follow the recording track TR. As shown in FIG. 3, a photodetector 19 of a conventional optical head apparatus has a main-beam light-receiving unit 19M for detecting zero-order diffracted light (main beam) which is reflected by the optical disc, and sub-beam light-receiving units 19S1 and 19S2 for detecting positive and negative first-order diffracted light (sub beams) which is reflected by the optical disc. The main-beam light-receiving unit 19M is divided in four sections and includes divisional light-receiving elements 19a, 19b, 19c, and 19d. The sub-beam light-receiving unit 19S1 is divided in two sections and includes divisional light-receiving elements 19e and 19f. The sub-beam light-receiving unit 19S2 is divided in two sections and includes divisional light-receiving elements 19g and 19h. If detection signal values of the divisional light-receiving elements 19a, 19b, 19c, 19d, 19e, 19f, 19g, and 19h are A, B, C, D, E, F, G, and H, respectively, a main-beam push-pull signal MPP is expressed by the equation:

$$MPP=(A+B)-(C+D),$$

a sub-beam push-pull signal SPP is expressed by the equation:

$$SPP=(E-F)+(G-H),\text{ and}$$

a differential push-pull error signal (tracking signal) TES is expressed by the equation:

$$\begin{aligned}TES &= MPP - k \cdot SPP \\ &= (A+B)-(C+D)-k\{(E-F)+(G-H)\}\end{aligned}$$

where k is a coefficient (see Patent documents 1 and 2, for example).

Patent document 1: Japanese Patent Kokai Publication No. 61-94246

Patent document 2: Japanese Patent Kokai Publication No. 2005-346882

DISCLOSURE OF THE INVENTION

Problems to be Solved by the Invention

However, in the optical head apparatus irradiating an optical disc with the main beam and the sub beams, it is generally set that an intensity ratio between the main beam and the sub beam is about 10 to 1. In such setting, the following problem occurs when recording/reproducing on/from a dual-layer optical disc is performed.

For example, for reproducing the dual-layer optical disc, when laser light is collected on one of information recording surfaces which is an access-target information recording surface, unnecessary reflected light from the other information recording surface which is not the access-target information recording surface (hereinafter referred to as 'interlayer stray light') enters a divisional light-receiving element of a photodetector in the optical head apparatus. Particularly, for producing a differential push-pull signal, there is a problem that interlayer stray light of the main beam is detected by the sub-beam light-receiving units 19S1 and 19S2, an offset occurs in a sub-beam detection signal, a tracking error signal cannot be accurately obtained, and thereby servo performance is deteriorated and further a servo error is caused.

To solve this problem, in Patent document 2, a phenomenon that interlayer stray light causes a tracking error signal inaccurate is avoided through the use of a signal of a light-receiving device disposed near a sub-beam light-receiving unit. However, owing to such a solution, light-receiving devices and calculation circuits are added and consequently, another problem occurs that the configuration of the optical head apparatus is complicated.

The present invention is made to solve the problems of the conventional art and its object is to provide an optical head apparatus and an optical disc apparatus which can reduce undesirable influence on a differential push-pull signal caused by interlayer stray light, without making the configuration complicated.

Means of Solving the Problem

According to the present invention, an optical head apparatus irradiating a multi-layer optical disc having a plurality of information recording surfaces with laser light and detecting reflected light of the laser light, includes: a laser light source; a diffraction means splitting laser light which is emitted from the laser light source into zero-order diffracted light, positive-first-order diffracted light, and negative-first-order diffracted light; a photodetector; and an optical system means collecting the zero-order diffracted light, the positive-first-order diffracted light, and the negative-first-order diffracted light, on an access-target information recording surface out of the plurality of information recording surfaces, and guiding on the photodetector, reflected light of the zero-order diffracted light, reflected light of the positive-first-order diffracted light, and reflected light of the negative-first-order diffracted light by the access-target information recording surface; wherein: the optical system means includes an adjusting means moving a light-collected position of the zero-order diffracted light, the positive-first-order diffracted light, and the negative-first-order diffracted light, in a focus direction and a tracking direction; the photodetector includes a main-beam light-receiving unit which is disposed at a position where the reflected light of the zero-order diffracted light by the access-target information recording surface is received, a first sub-beam light-receiving unit which is disposed at a position where the reflected light of the positivefirst-order diffracted light by the access-target information recording surface is received, and a second sub-beam light-receiving unit which is disposed at a position where the reflected light of the negative-first-order diffracted light by the access-target information recording surface is received; the first sub-beam light-receiving unit is divided by a first division line in an x-direction being a direction on the photodetector corresponding to a tangential direction of a recording track on the optical disc, and includes a first divisional light-receiving element and a second divisional light-receiving element which are arranged in a y-direction being orthogonal to the x-direction; the second sub-beam light-receiving unit is divided by a second division line in the x-direction, and includes a third divisional light-receiving element and a fourth divisional light-receiving element which are arranged in the y-direction; $U_y=T_y \times N_1$ is satisfied, where $T_y$ denotes a length in the y-direction of one period of an interference fringe which is formed on the photodetector by reflected light of the zero-order diffracted light by an information recording surface other than the access-target information recording surface, reflected light of the positive-first-order diffracted light by the information recording surface other than the access-target information recording surface, and reflected light of the negative-first-order diffracted light by the information recording surface other than the access-target information recording surface, $N_1$ denotes a positive integer, and $U_y$ denotes each length in the y-direction of the first divisional light-receiving element, the second divisional light-receiving element, the third divisional light-receiving element, and the fourth divisional light-receiving element.

According to the present invention, another optical head apparatus irradiating a multi-layer optical disc having a plurality of information recording surfaces with laser light and detecting reflected light of the laser light, includes: a laser light source; a diffraction means splitting laser light which is emitted from the laser light source into zero-order diffracted light, positive-first-order diffracted light, and negative-first-order diffracted light; a photodetector; and an optical system means collecting the zero-order diffracted light, the positive-first-order diffracted light, and the negative-first-order diffracted light, on an access-target information recording surface out of the plurality of information recording surfaces, and guiding reflected light of the zero-order diffracted light, reflected light of the positive-first-order diffracted light, and reflected light of the negative-first-order diffracted light by the access-target information recording surface, on the photodetector; wherein: the optical system means includes an adjusting means moving a light-collected position of the zero-order diffracted light, the positive-first-order diffracted light, and the negative-first-order diffracted light, in a focus direction and a tracking direction; the photodetector includes a main-beam light-receiving unit which is disposed at a position where the reflected light of the zero-order diffracted light by the access-target information recording surface is received; a first sub-beam light-receiving unit which is disposed at a position where the reflected light of the positive-first-order diffracted light by the access-target information recording surface is received; and a second sub-beam light-receiving unit which is disposed at a position where the reflected light of the negative-first-order diffracted light by the access-target information recording surface is received; the first sub-beam light-receiving unit is divided by a first division line in an x-direction being a direction on the photodetector corresponding to a tangential direction of a recording track on the optical disc, and includes a first divisional light-receiving element and a second divisional light-receiving element which are arranged in a y-direction being orthogonal to the x-direction; the second sub-beam light-receiving unit is divided by a second division line in the x-direction, and includes a third divisional light-receiving element and a fourth divisional light-receiving element which are arranged in the y-direction; $V_y=T_y \times N_2$ is satisfied, where $T_y$ denotes a length in the y-direction of one period of an interference fringe which is formed on the photodetector by reflected light of the zero-order diffracted light by an information recording surface other than the access-target information recording surface, reflected light of the positive-first-order diffracted light by the information recording surface other than the access-target information recording surface, and reflected light of the negative-first-order diffracted light by the information recording surface other than the access-target information recording surface, $N_2$ denotes a positive integer, and $V_y$ denotes a distance from a center of a main-beam light-receiving unit to the first division line and a distance from a center of the main-beam light-receiving unit to the second division line.

EFFECTS OF THE INVENTION

According to the present invention, the apparatus is configured so as to make a length in the y-direction $U_y$ of the divisional light-receiving element of the sub-beam light-receiving unit be $N_2$ times, $N_2$ being an integer, as long as a length in the y-direction $T_y$ of one period of an interference fringe formed on the divisional light-receiving element by reflected light from an information recording surface other than an access-target information recording surface, and thereby it is possible to reduce influence of interlayer stray light on a sub-beam push-pull signal. Therefore, an effect to improve accuracy of tracking control can be achieved without making a configuration of the apparatus complicated.

Furthermore, according to the present invention, the apparatus is configured so as to satisfy $V_y=(T_y/2) \times \{N_2-(\frac{1}{2})\}$, where $V_y$ denotes a distance from the center of the main-beam light-receiving unit to the division line of the divisional light-receiving element of the sub-beam light-receiving unit and $T_y$ denotes a length in the y-direction of one period of an interference fringe formed on the divisional light-receiving element by reflected light from an information recording surface other than an access-target information recording surface, and thereby it is possible to reduce influence of interlayer stray light on a sub-beam push-pull signal. Therefore, the effect to improve accuracy of tracking control can be achieved without making a configuration of the apparatus complicated.

BRIEF DESCRIPTION OF THE DRAWINGS

FIG. 6A and FIG. 6B relate to the optical head apparatus according to the first embodiment of the present invention: FIG. 6A is a diagram showing an x-direction which is a tangential direction of a recording track on an optical disc and a y-direction which is a radial direction of the optical disc; and FIG. 6B is a diagram schematically showing a configuration of an optical system of an optical head apparatus according to the first embodiment of the present invention.

FIG. 7 is a plan view showing an arrangement and shapes of divisional light-receiving elements of a photodetector in the optical head apparatus according to the first embodiment.

FIG. 10 is a diagram showing an interference fringe on divisional light-receiving elements, by the interlayer stray light of the main beam and interlayer stray light of sub beams, from the first information recording surface, in the case of FIG. 8.

FIG. 13 is a diagram showing an interference fringe on the divisional light-receiving elements and a waveform of a push-pull signal in a first sub-beam light-receiving unit, in the case of FIG. 8.

FIG. 14 is a diagram showing an interference fringe on the divisional light-receiving elements, by the interlayer stray light of the main beam and the interlayer stray light of the sub beams, from the second information recording surface, in the case of FIG. 9.

FIG. 15 is a diagram showing the interference fringe on the divisional light-receiving elements and a waveform of a push-pull signal in a first sub-beam light-receiving unit, in the case of FIG. 9.

FIG. 16 is a plan view showing divisional light-receiving elements of a photodetector in the optical head apparatus according to the second embodiment of the present invention and a length in a y-direction of an interference fringe by interlayer stray light.

FIG. 17A is a plan view showing divisional light-receiving elements and an interference fringe by interlayer stray light in the example for comparison; FIG. 17B is a plan view showing divisional light-receiving elements and an interference fringe by interlayer stray light in another example for comparison; and FIG. 17C is a plan view showing divisional light-receiving elements and an interference fringe by interlayer stray light in the second embodiment.

FIG. 18A, FIG. 18B, and FIG. 18C are diagrams showing influence of an interference fringe by interlayer stray light on a sub-beam push-pull signal in the optical head apparatus of the example for comparison which has the photodetector of FIG. 17A.

FIG. 19A, FIG. 19B, and FIG. 19C are diagrams showing influence of an interference fringe by interlayer stray light on a sub-beam push-pull signal in the optical head apparatus of the other example for comparison which has the photodetector of FIG. 17B.

Figure 1:
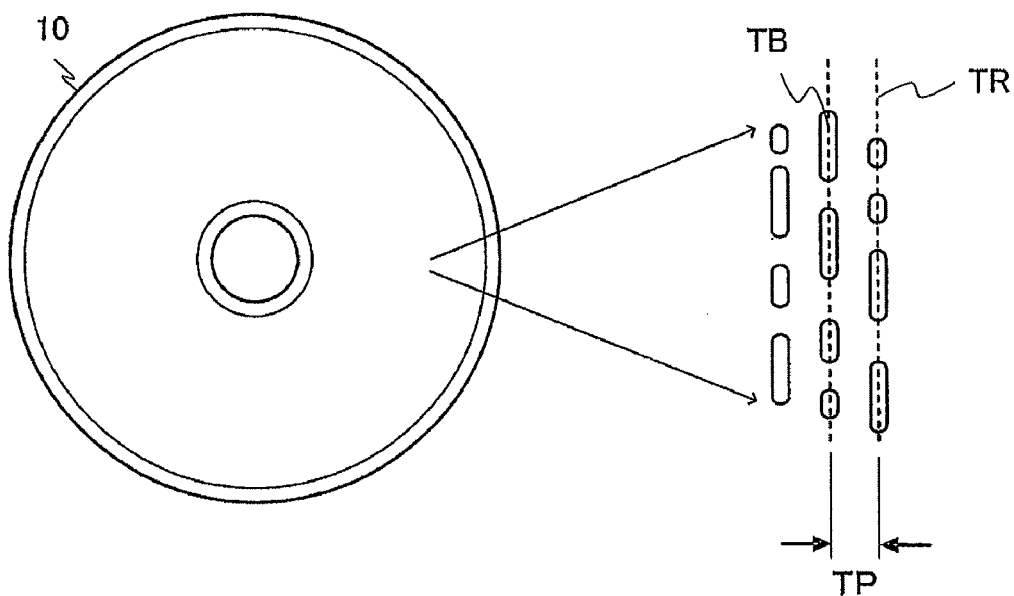
FIG. 1 is a diagram showing a plan view of a playback-only optical disc and recording tracks.
Figure 2:
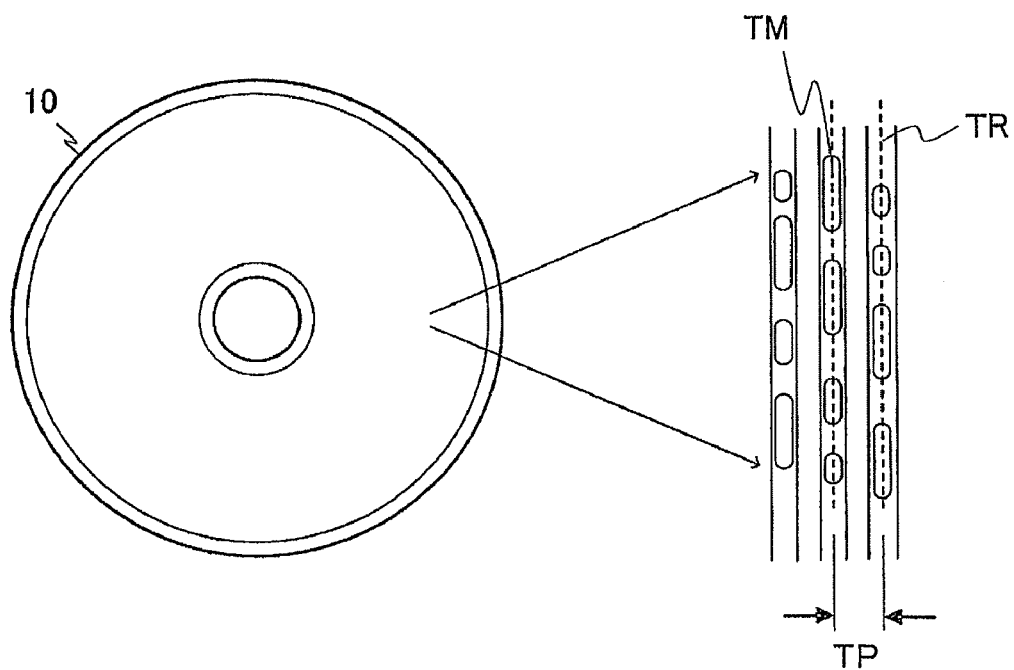
FIG. 2 is a diagram showing a plan view of a write-once or rewritable type optical disc and recording tracks.
Figure 3:
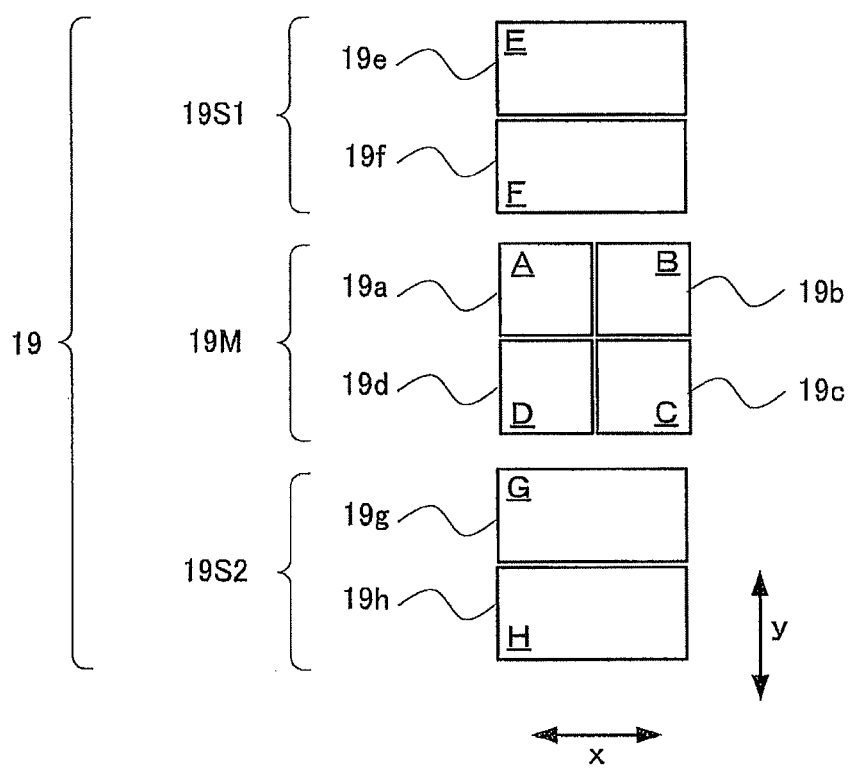
FIG. 3 is a plan view showing divisional light-receiving elements of a conventional optical head apparatus.

EXPLANATION OF REFERENCE NUMERALS AND SYMBOLS 1 laser light source; 2 diffraction grating; 3 polarization beam splitter; 4 collimator lens; 5 quarter-wave plate; 6 objective lens; 7 objective lens actuator; 8 cylindrical lens; 9 photodetector; 9M main-beam light-receiving unit; 9S1 first sub-beam light-unit; 9S2 second sub-beam light-receiving unit; 9a, 9b, 9c, 9d divisional light-receiving element of main-beam light-receiving unit; 9e, 9f divisional light-receiving element of first sub-beam light-receiving unit; 9g, 9h divisional light-receiving element of second sub-beam light-receiving unit; 10 optical disc; 10a substrate; 10b first information recording surface; 10c intermediate layer; 10d second information recording surface; 10e cover layer; 10f disc surface; 10g, 10h access-target information recording surface; 11 spindle motor; 12 spindle controlling circuit; 21 optical head apparatus; 22 thread mechanism; 23 thread controlling circuit; 24 matrix circuit; 25 signal reproducing circuit; 26 servo circuit; 27 laser controlling circuit; 28 controller; 41 detected light of main beam; 42, 43 detected light of sub beams; 51, 61 interlayer stray light of main beam; 52, 53, 62, 63 interlayer stray light of sub beams; $T_y$ length in y-direction of one period of interference fringe by interlayer stray light; $U_y$ length in y-direction of divisional light-receiving element of first sub-beam light-receiving unit and divisional light-receiving element of second sub-beam light-receiving unit; $V_y$ distance in y-direction from the center of main-beam light-receiving unit to boundary between divisional light-receiving element of first sub-beam light-receiving unit and divisional light-receiving element of second sub-beam light-receiving unit.

BEST MODE FOR CARRYING OUT THE INVENTION

First Embodiment

Figure 4:
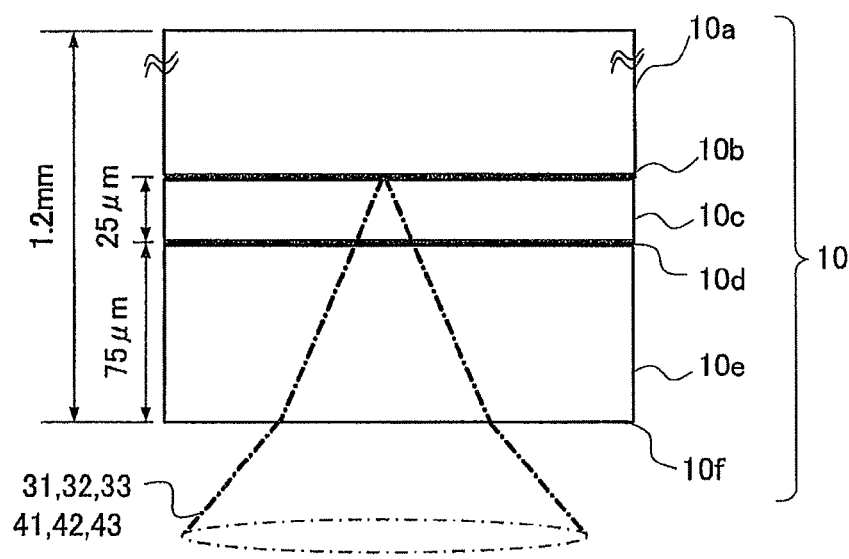
FIG. 4 is a diagram schematically showing a cross sectional view of a dual-layer optical disc.

FIG. 4 is a cross sectional view schematically showing a configuration of a dual-layer optical disc 10. As shown in FIG. 4, the optical disc 10 includes a substrate 10a, a first information recording surface 10b formed on the substrate 10a, an intermediate layer 10e formed on the first information recording surface 10b, a second information recording surface 10d formed on the intermediate layer 10c, and a cover layer 10e formed on the second information recording surface 10d. For a rewritable blu-ray disc having two information recording surfaces, the disc is 1.2 mm thick, the intermediate layer 10c is 25 μm thick, and the cover layer 10e is 75 μm thick. Laser light (a dot-dash line) which includes zero-order diffracted light 31 (a main beam), positive-first-order diffracted light 32 (a sub beam) and negative-first-order diffracted light 33 (a sub beam), as described below, enters from a disc surface 10f and is collected on the first information recording surface 10b or the second information recording surface 10d. The laser light being blue-violet laser with a wavelength of 405 nm, is collected by an objective lens of NA 0.85 which is not shown in the drawings. Laser light 41, 42, and 43 being reflected at the first information recording surface 10b or the second information recording surface 10d are detected by a photodetector described below.

Figure 5:
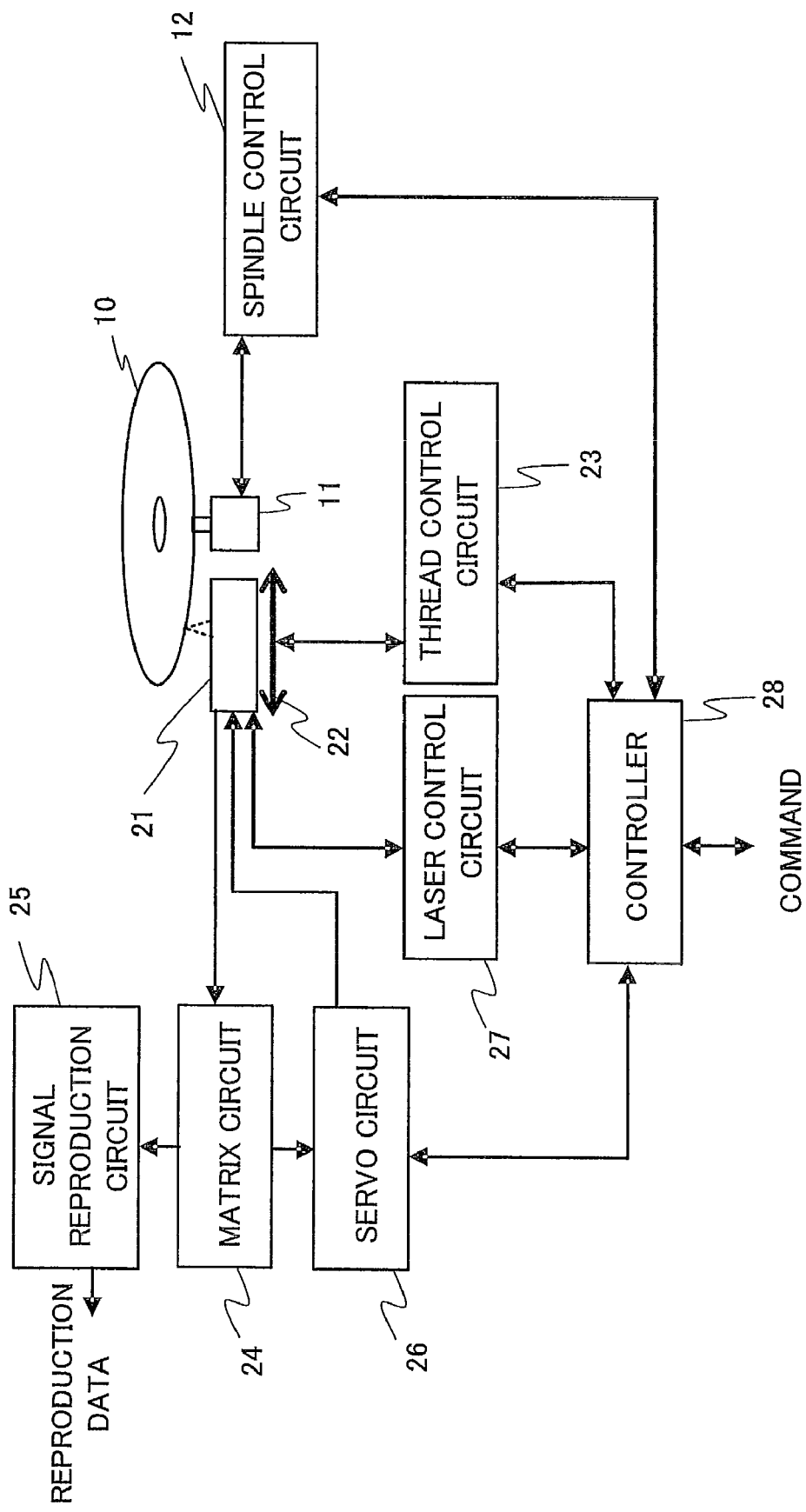
FIG. 5 is a block diagram showing a configuration of an optical disc apparatus according to a first embodiment of the present invention.

FIG. 5 is a block diagram schematically showing a configuration of the optical disc apparatus according to the first embodiment of the present invention. As shown in FIG. 5, the optical disc apparatus according to the first embodiment includes a spindle motor 11 rotating a turntable (not shown in the drawing) onto which the optical disc 10 is mounted, an optical head apparatus 21 irradiating the optical disc 10 with laser light and detecting reflected light of the laser light, a matrix circuit 24, a signal reproducing circuit 25, a servo circuit 26, a spindle controlling circuit 12, a laser controlling circuit 27, a thread controlling circuit 23, and a controller 28 formed by a microcomputer.

The spindle motor 11 rotates the turntable onto which the optical disc 10 is mounted. The spindle controlling circuit 12 controls an operation of the spindle motor 11.

The optical head apparatus 21 irradiates the multi-layer optical disc 10 having a plurality of information recording surfaces with laser light and detects reflected light of the laser light. A thread mechanism 22 moves the optical head apparatus 21 in a radial direction of the optical disc 10 and thereby makes it possible to read information recorded in a desired position in the radial direction of the optical disc 10 by the optical head apparatus 21. The thread controlling circuit 23 controls an operation of the thread mechanism 22.

The matrix circuit 24 having a matrix calculating/amplifying circuit and the like, performs a matrix calculation on output signals from a plurality of divisional light-receiving elements of a photodetector in the optical head apparatus 21 and produces a necessary signal. The matrix circuit 24 produces, for example, a high-frequency reproduction signal, a focus error signal, a tracking error signal for servo control, and the like. The reproduction signal output from the matrix circuit 24 is supplied to the signal reproducing circuit 25, and the focus error signal and the tracking error signal are supplied to the servo circuit 26.

The signal reproducing circuit 25 performs binarization of the reproduction signal and recovered clock generating processing and the like, and produces reproduction data. The decoded reproduction data is transferred to a host device which is not shown in the drawings. The host device is an AV system device, a personal computer or the like, for example.

On the basis of the focus error signal and the tracking error signal supplied from the matrix circuit 24, the servo circuit 26 produces a focus servo driving signal and a tracking servo driving signal, and causes the optical head apparatus 21 to perform a servo operation. That is, the servo circuit 26 produces a focus driving signal and a tracking driving signal in accordance with the focus error signal and the tracking error signal, and drives a focus coil and a tracking coil of the optical head apparatus 21. Such a configuration produces a tracking servo loop and a focus servo loop, which include the optical head apparatus 21, the matrix circuit 24 and the servo circuit 26.

The laser controlling circuit 27 controls intensity of laser which is emitted by the laser light source of the optical head apparatus 21. The controller 28 controls operations of a servo system and a reproduction system, in accordance with a command from the host device.

FIG. 6A and FIG. 6B relate to the optical head apparatus 21 according to the first embodiment of the present invention: FIG. 6A is a diagram showing an x-direction which is a tangential direction of a recording track on the optical disc 10 and a y-direction which is a radial direction of the optical disc 10; and FIG. 6B is a diagram schematically showing a configuration of an optical system of the optical head apparatus 21 according to the first embodiment. The x-direction on the optical disc 10 in FIG. 6A corresponds to an x-direction on a photodetector 9.

As shown in FIG. 6B, the optical head apparatus 21 according to the first embodiment irradiates the multi-layer optical disc 10 having the plurality of information recording surfaces with the laser light 31, 32, and 33, and detects the reflected light 41, 42, and 43 of the laser light. The optical head apparatus 21 includes: a laser light source (semiconductor laser) 1; a diffraction means having a diffraction grating 2 splitting laser light 30 which is emitted from the laser light source 1 into the zero-order diffracted light 31 (main beam), the positive-first-order diffracted light 32 (sub beam) and the negative-first-order diffracted light 33 (sub beam); a polarization beam splitter 3; a collimator lens 4; a quarter-wave plate 5; an objective lens 6; an objective lens actuator 7 driving the objective lens 6 in the focus direction and the tracking direction; a cylindrical lens 8; and the photodetector 9 detecting the reflected laser light 41, 42, and 43 by the optical disc 10. The polarization beam splitter 3, the collimator lens 4, the quarter-wave plate 5, the objective lens 6, the objective lens actuator 7 driving the objective lens 6 in the focus direction and the tracking direction, and the cylindrical lens 8 forming an optical system means which collects the zero-order diffracted light 31, the positive-first-order diffracted light 32, and the negative-first-order diffracted light 33 being diffracted at the diffraction grating 2, on an access-target information recording surface out of the plurality of information recording surfaces, and guides the reflected light 41 of the zero-order diffracted light, the reflected light 42 of the positive-first-order diffracted light, and the reflected light 43 of the negative-first-order diffracted light by the access-target information recording surface, onto the divisional light-receiving elements in the photodetector 9.

FIG. 7 is a plan view showing an arrangement and shapes of the divisional light-receiving elements of the photodetector 9 in the optical head apparatus 21 according to the first embodiment. As shown in FIG. 7, the photodetector 9 includes a main-beam light-receiving unit 9M detecting the zero-order diffracted light 41 (main beam) reflected at the optical disc 10, a sub-beam light-receiving unit 9S1 detecting the positive-first-order diffracted light 42 (sub beam) reflected at the optical disc 10, and a sub-beam light-receiving unit 9S2 detecting the negative-first-order diffracted light 43 (sub beam) reflected at the optical disc 10. The main-beam light-receiving unit 9M is equally divided in four sections by a division line in an x-direction and a division line in a y-direction and includes divisional light-receiving elements 9a, 9b, 9c, and 9d. The sub-beam light-receiving unit 9S1 is divided in two sections by a division line in the x-direction and includes two divisional light-receiving elements 9e and 9f which are arranged in the y-direction. The sub-beam light-receiving unit 9S2 is divided in two sections by a division line in the x-direction and includes two divisional light-receiving elements 9g and 9h which are arranged in the y-direction. Given detection signal values of the divisional light-receiving elements 9a, 9b, 9c, 9d, 9e, 9f, 9g, and 9h are A, B, C, D, E, F, G, and H, respectively, a main-beam push-pull signal MPP is expressed by the following equation:

$$MPP=(A+B)-(C+D),$$

a sub-beam push-pull signal SPP is expressed by the following equation:

$$SPP=(E-F)+(G-H), \text{ and}$$

a differential push-pull error signal (tracking signal) TES is expressed by the following equation:

$$TES = MPP - k \cdot SPP$$
$$= (A+B) - (C+D) - k\{(E-F) + (G-H)\},$$

where k denotes a coefficient.

As shown in FIG. 6B, the light emitted from the laser light source 1 firstly passes through the diffraction grating 2. The diffraction grating 2 produces the positive and negative first-order diffracted light 32 and 33 (sub beams) forming side spots for generating a tracking error signal, and then the polarization beam splitter 3 reflects the positive and negative first-order diffracted light 32 and 33 as well as the zero-order diffracted light 31 (main beam) forming a main spot. The main beam 31 and the sub beams 32 and 33 are collimated at the collimator lens 4, pass through the quarter-wave plate 5, and then are collected by the objective lens 6 on the first information recording surface 10b or the second information recording surface 10d of the optical disc 10. The collimator lens 4 changes its position, by a mechanism to change the position in an optical-axis direction being parallel to a laser-light traveling direction, for compensating spherical aberration caused by a thickness error in the cover layer 10e of the optical disc 10. The objective lens 6 moves in the focus direction and the tracking direction by the objective lens actuator 7.

Reflected light from the optical disc 10 passes through the objective lens 6, the quarter-wave plate 5 and the collimator lens 4, reaches the polarization beam splitter 3, and then transmits the polarization beam splitter 3. In the optical head apparatus 21 according to the first embodiment in which an astigmatism method is used for the focus error signal and a differential push-pull method is used for the tracking error signal, the light which has transmitted the polarization beam splitter 3 passes through the cylindrical lens 8 and enters the photodetector 9 for detecting a servo error signal and a reproduction signal and then photoelectric conversion is performed. On the basis of output from each of the light-receiving units of the photodetector 9, the focus error signal and the tracking error signal according to the differential push-pull method are determined.

In a case of the dual-layer optical disc 10, if the first information recording surface 10b and the second information recording surface 10d are the same in reflectivity, an intensity ratio η of interlayer stray light on the photodetector is given by the following equation:

$$\eta = S/\pi/M^2/(2d \cdot \tan\theta)^2$$

where S denotes the area of a divisional light-receiving element, M denotes the power of the detecting optical system, d denotes an interlayer distance, and θ denotes an angle formed by an optical axis and the most outer ray of the light-collected beam on the optical disc 10. In a combination of an objective lens of NA 0.85 and an optical disc having a cover layer CL of refractive index 1.6, θ is about 32 degrees. Given that the divisional light-receiving element is a quadrilateral having a side of 150 µm, the power of an optical system is fourteen times and an interlayer interval is 25 µm, the intensity ratio η of the interlayer stray light can be calculated as the following equation:

$$\eta = S/\pi/M^2/(2d \cdot \tan\theta)^2$$
$$= (150 \times 150)/\pi/14^2/\{(2 \times 25) \cdot \tan(32°)\}^2$$

-continued
$$= 22500/\pi/196/\{50 \cdot 0.6249\}^2$$
$$= 22500/\pi/196/976.25$$
$$\approx 0.037$$

Accordingly, the intensity ratio η of the interlayer stray light is about 3.7%. For this reason, when stray light of the main beam enters the divisional light-receiving elements 9a, 9b, 9c, and 9d of the main-beam light-receiving unit 9M, the intensity ratio of the interlayer stray light is 3.7% and the interlayer stray light has little influence. However, when the interlayer stray light of the main beam enters the divisional light-receiving elements 9e and 9f and the divisional light-receiving elements 9g and 9h of the sub-beam light-receiving units 9S1 and 9S2, the intensity of the sub beam is 1/10 of that of the main beam, the intensity ratio of the interlayer stray light is accordingly 37%, i.e. ten times, and it cannot be ignored.

Figure 8A:
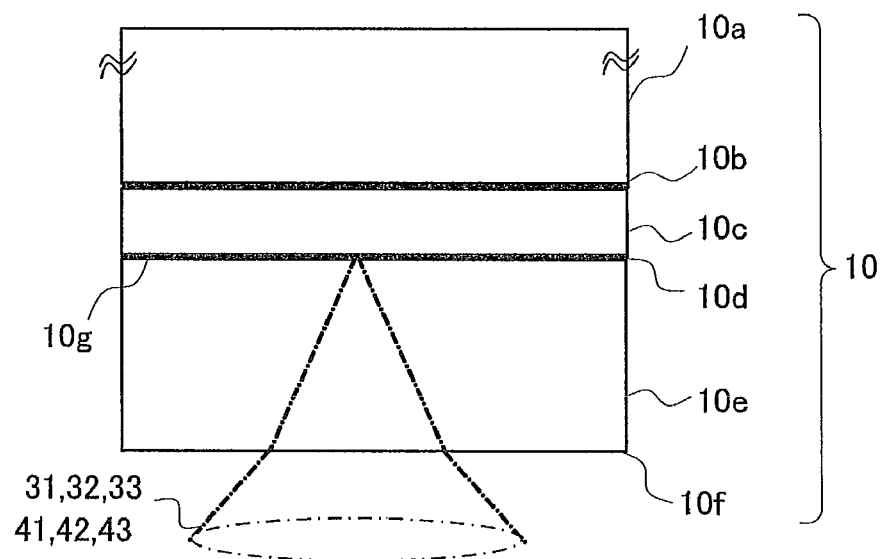
FIG. 8A is a diagram showing a case that a second information recording surface is an access target and a first information recording surface is not an access target.
Figure 8B:
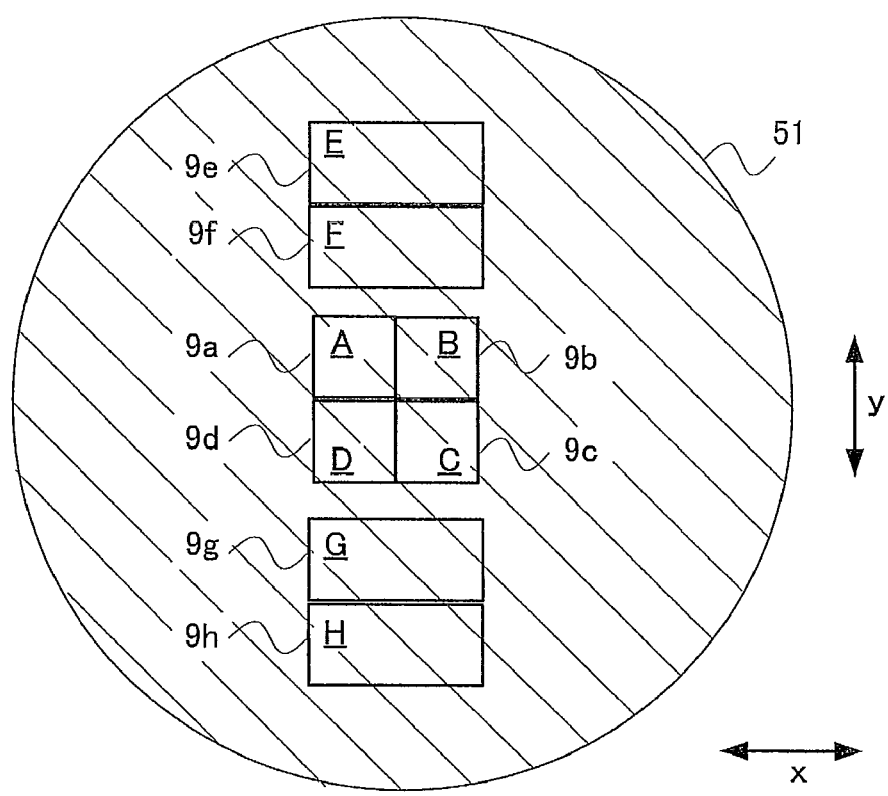
FIG. 8B is a diagram showing a shape of a spot of interlayer stray light of a main beam from the first information recording surface on the photodetector.

FIG. 8A is a diagram showing a case that the second information recording surface 10d of the optical disc 10 is an access target and the first information recording surface 10b is not an access target. FIG. 8B is a diagram showing a shape of a spot of the interlayer stray light of the main beam from the first information recording surface 10b on the photodetector 9. As shown in FIG. 8B, in the case that the second information recording surface 10d of the optical disc 10 is the access target, when a light-collected spot is irradiated, the spot of the interlayer stray light 51 of the main beam from the first information recording surface 10b which is not the access target is substantially circle-shaped.

Figure 9A:
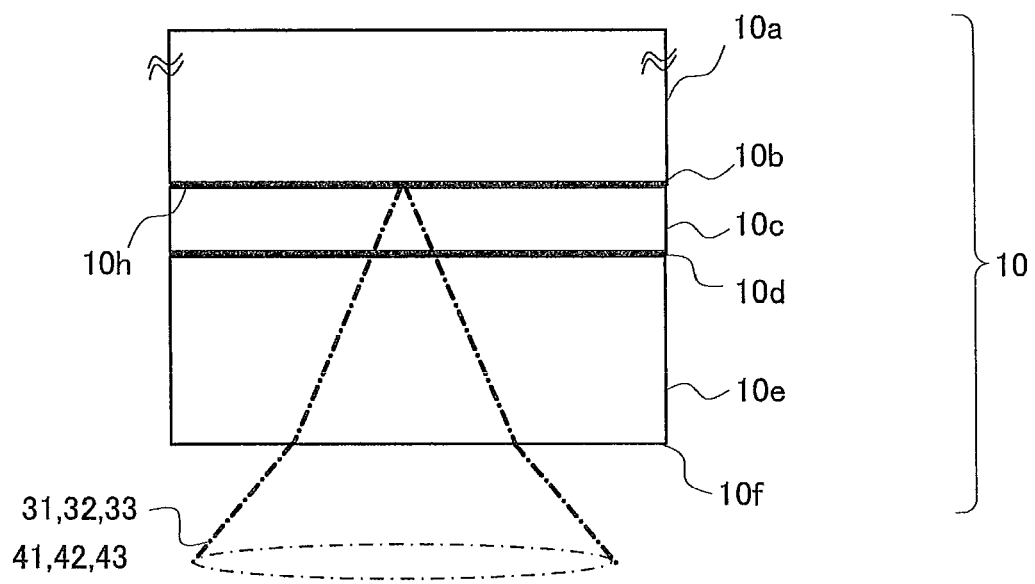
FIG. 9A is a diagram showing a case that the first information recording surface is an access target and the second information recording surface is not an access target.
Figure 9B:
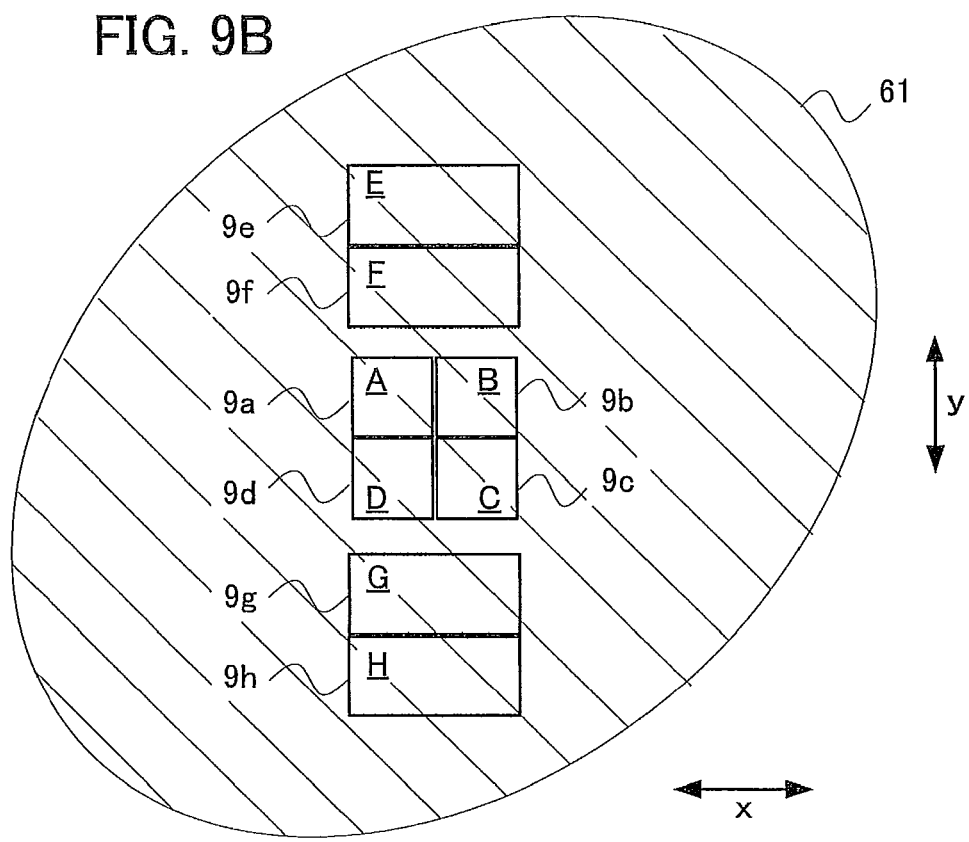
FIG. 9B is a diagram showing a shape of a spot of interlayer stray light of a main beam from the second information recording surface on the photodetector.

FIG. 9A is a diagram showing a case that the first information recording surface 10b of the optical disc 10 is an access target and the second information recording surface 10d is not an access target. FIG. 9B is a diagram showing a shape of a spot of the interlayer stray light of the main beam from the first information recording surface 10d on the photodetector 9. As shown in FIG. 9B, in the case that the first information recording surface 10b of the optical disc 10 is the access target, when a light-collected spot is irradiated, the spot of the interlayer stray light 61 of the main beam from the second information recording surface 10d which is not the access target is oval-shaped.

FIG. 10 is a diagram showing an interference fringe on the divisional light-receiving elements by the interlayer stray light of the main beam from the first information recording surface 10b and interlayer stray light of the sub beams, in the case of FIG. 8. As shown in FIG. 10, in the case that the second information recording surface 10d of the optical disc 10 is the access target, when the light-collected spot is irradiated, the interlayer stray light 51 of the main beam from the first information recording surface 10b which is not the access target and interlayer stray light 52 and 53 of the sub beams form an interference fringe 54 in a striped pattern that bright bands and dark bands extending in the x-direction are arranged one after the other in the y-direction, on the photodetector 9. A length (width) in the y-direction of one period of the interference fringe 54 is $T_y$ µm. Furthermore, a parallel direction to the interference fringe 54 is the x-direction and an orthogonal direction to the interference fringe is the y-direction. On signals E and F detected by the divisional light-receiving elements 9e and 9f of the sub-beam light-receiving unit 9S1, a calculation of (E−F) is performed, and on detected signals G and H by the divisional light-receiving elements 9g and 9h of the sub-beam light-receiving unit 9S2, a calculation of (G−H) is performed. Thus, a signal (E−F) and a signal (G-H) are detected under the influence of the interference fringe by the interlayer stray light.

Figure 11:
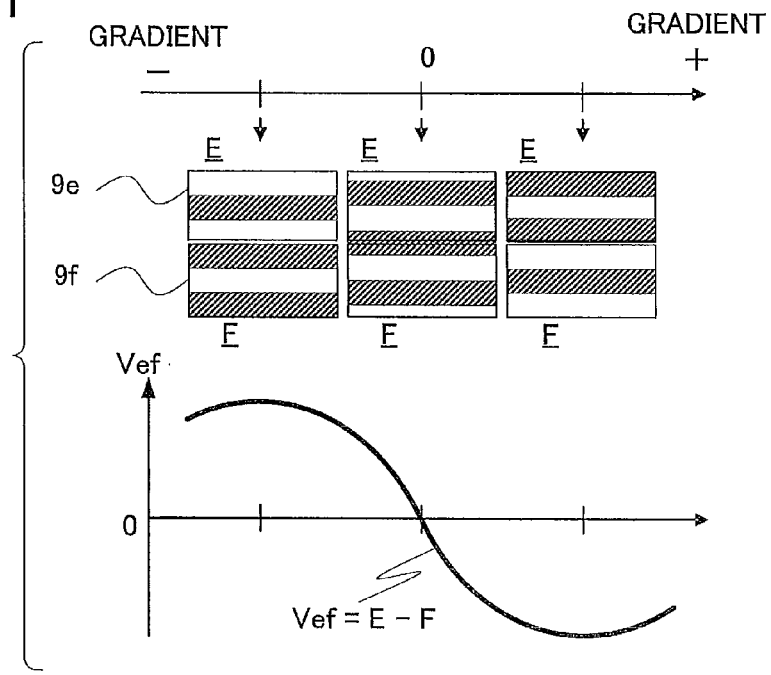
FIG. 11 is a diagram showing an interference fringe on divisional light-receiving elements of an optical head apparatus and a waveform of a push-pull signal in a first sub-beam light-receiving unit according to an example for comparison.

FIG. 11 is a diagram showing an interference fringe on the divisional light-receiving elements of the photodetector in the optical head apparatus and a waveform of a push-pull signal Vef at the divisional light-receiving elements 9e and 9f of the sub-beam light-receiving unit 9S1, in an example for comparison. When the optical disc 10 rotates, a relative slope of the optical disc 10 to the objective lens 6 slightly changes. The interference fringe by the stray light of the main beam and the stray light of the sub beam vertically moves in the y-direction in accordance with the slight change in relative slope. FIG. 11 shows how the interference fringe shifts on the divisional light-receiving elements 9e and 9f and a signal Vef=(E-F) obtained from a calculation on the signals E and F detected by the divisional light-receiving elements 9e and 9f. As shown in FIG. 11, in consequence of the shift of the interference fringe, the signal Vef=(E-F) changes. The change in the signal Vef=(E-F) makes a differential push-pull signal inaccurate. Thus, servo performance is deteriorated and further a servo error is caused. Furthermore, it is the same as to the detection signals G and H detected by the divisional light-receiving elements 9g and 9h, and also a signal Vgh=(G-H) changes.

Figure 12:
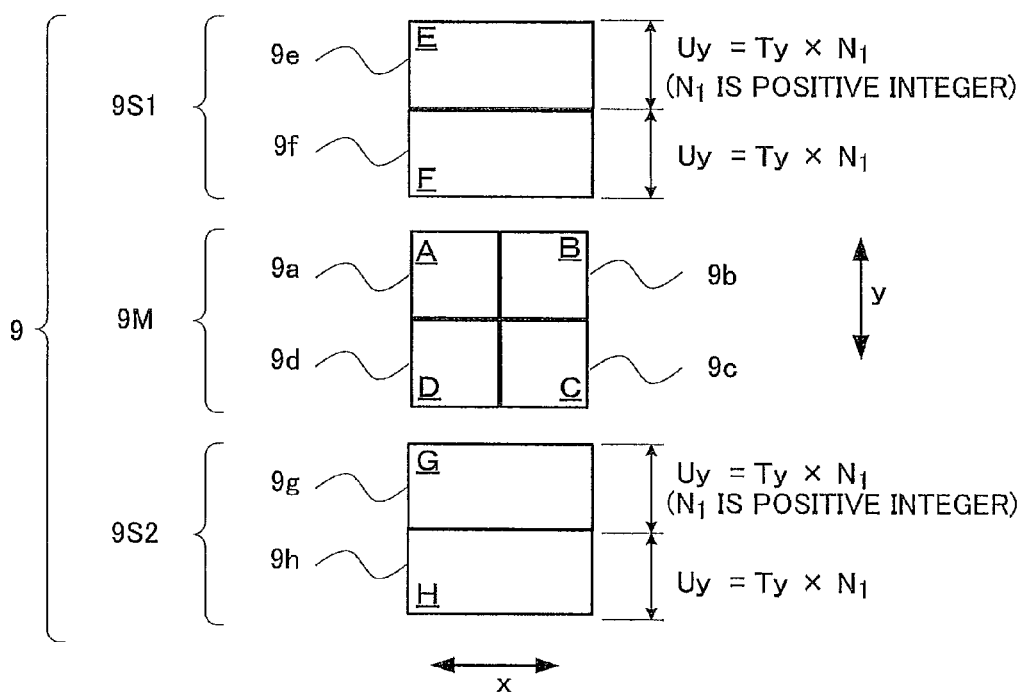
FIG. 12 is a diagram showing the divisional light-receiving elements of the optical head apparatus according to the first embodiment.

In the first embodiment of the present invention, a configuration shown in FIG. 12 is adopted, in order to reduce the phenomenon shown in FIG. 11. FIG. 12 is a diagram showing the divisional light-receiving elements of the photodetector 9 in the optical head apparatus 21 according to the first embodiment. As shown in FIG. 12, the photodetector 9 in the optical head apparatus 21 according to the first embodiment is made so as to satisfy $$U_y = T_y \times N_1,$$

where $T_y$ denotes a length (width) in the y-direction of one period of an interference fringe which is formed on the photodetector by the reflected light 41 of the zero-order diffracted light by an information recording surface other than the access-target information recording surface, the reflected light 42 of the positive-first-order diffracted light by the information recording surface other than the access-target information recording surface, and the reflected light 43 of the negative-first-order diffracted light by the information recording surface other than the access-target information recording surface, $N_1$ denotes a positive integer, and $U_y$ denotes each length in the y-direction of the divisional light-receiving element 9e, the divisional light-receiving element 9f, the divisional light-receiving element 9g, and the divisional light-receiving element 9h. The length $T_y$ of one period of the interference fringe can be determined from a calculation on the basis of characteristics and positions of the optical elements configuring the optical head apparatus 21 and the like and conditions such as characteristics of the laser light.

FIG. 13 is a diagram showing an interference fringe on the divisional light-receiving elements 9e and 9f and a waveform of a push-pull signal Vef in the sub-beam light-receiving unit 9S1, in the case of FIG. 8. FIG. 13 shows how the interference fringe shifts and the signal Vef=(E-F) obtained from a calculation on signals E and F detected by the divisional light-receiving elements 9e and 9f, if the lengths in the y-direction $U_y$ of the divisional light-receiving elements 9e and 9f for detecting the sub beam are $T_y \times N_1$ ($N_1$ being a positive integer). As shown in FIG. 13, if it is configured to satisfy a condition of $U_y = T_y \times N_1$, the signal Vef=(E-F) is 0. Furthermore, the same holds true for a signal (G-H) of the divisional light-receiving elements 9g and 9h. For this reason, in the first embodiment, the differential push-pull signal TES is not influenced by the interference fringe by the interlayer stray light.

For a comparison, a case that each of the lengths in the y-direction $U_y$ of the divisional light-receiving elements 9e, 9f, 9g, and 9h of the sub-beam light-receiving units is a length of $T_y/2 \times (2m+1)$ (m=0, 1, 2, ...) will be considered: the signal (E-F) and the signal (G-H) calculated from the signals E, F, G, and H detected by the divisional light-receiving elements 9e, 9f, 9g, and 9h of the sub-beam light-receiving units maximally change and influence on the differential push-pull signal TES is the maximum.

FIG. 14 is a diagram showing an interference fringe on the divisional light-receiving elements, by the interlayer stray light of the main beam from the second information recording surface 10d and the interlayer stray light of the sub beam, in the case of FIG. 9. In this case, the interference fringe extends in an oblique direction being sloped to the x-direction. Furthermore, a length in the y-direction of one period of the interference fringe is $T_y$ μm, and $U_y = T_y \times N_1$ is satisfied.

FIG. 15 is a diagram showing an interference fringe on the divisional light-receiving elements and a waveform of a push-pull signal of the sub-beam light-receiving unit 9S1, in the case of FIG. 9. The drawing shows how the interference fringe shifts if the lengths in the y-direction of the divisional light-receiving elements 9e and 9f for detecting the sub beam are $T_y \times N_1$ and the signal (E-F) which is calculated from the signals E and F detected by the divisional light-receiving elements 9e and 9f. Even if the interference fringe shifts, the signal (E-F) is 0 and has no influence on the differential push-pull signal. Furthermore, the same holds true for the signal (G-H) in connection with the signals detected by the divisional light-receiving elements 9g and 9h.

As described above, by making the lengths $U_y$ in the y-direction of the divisional light-receiving elements 9e, 9f, 9g, and 9h for detecting the sub beams be $T_y \times N_1$, it is possible to reduce the phenomenon that the interlayer stray light causes the differential push-pull signal inaccurate. Thus, accuracy of tracking control can be improved without making the configuration of the apparatus complicated.

Second Embodiment

FIG. 16 is a plan view showing divisional light-receiving elements of a photodetector in an optical head apparatus according to a second embodiment of the present invention and lengths (widths) in a y-direction of an interference fringe by interlayer stray light. In the optical head apparatus according to the second embodiment, as a condition regarding positions and sizes of the divisional light-receiving elements of the photodetector 9, a different condition is applied from the condition in the first embodiment. For this reason, FIG. 5 and FIG. 6 are also referred in the explanation of the second embodiment.

In the second embodiment, in order to reduce a phenomenon that a differential push-pull signal is inaccurate, a division line dividing a sub-beam light-receiving unit 9S1 into a divisional light-receiving element 9e and a divisional light-receiving element 9f is disposed at a position where intensity of an interference fringe is intermediate between the strongest and the weakest positions of intensity and a division line dividing a sub-beam light-receiving unit 9S2 into a divisional light-receiving element 9g and a divisional light-receiving element 9h is disposed at a position where the intensity of the interference fringe is intermediate between the strongest and the weakest positions of intensity.

According to FIG. 16, the sub-beam light-receiving unit 9S1 is divided by the first division line 9J in an x-direction being a direction on the photodetector 9 corresponding to a tangential direction of a recording track on an optical disc 10, that is, the divisional light-receiving element 9e and the divisional light-receiving element 9f which are arranged in the y-direction being orthogonal to the x-direction. The sub-beam light-receiving unit 9S2 is divided by the second division line 9K in the x-direction being a direction on the photodetector 9 corresponding to the tangential direction of the recording track of the optical disc 10 and includes the divisional light-receiving element 9g and the divisional light-receiving element 9h which are arranged in the y-direction being orthogonal to the x-direction. The optical head apparatus is configured so as to satisfy $V_y=(T_y/2)\times\{N_2-(1/2)\}$, where $T_y$ denotes a length in the y-direction of one period of an interference fringe which is formed on the photodetector 9 by the reflected light of the zero-order diffracted light by an information recording surface other than the access-target information recording surface, the reflected light of the positive-first-order diffracted light by the information recording surface other than the access-target information recording surface, and the reflected light of the negative-first-order diffracted light by the information recording surface other than the access-target information recording surface, $N_2$ denotes a positive integer, and $V_y$ denotes a distance from the center 9L of a main-beam light-receiving unit 9M to the first division line 9J and a distance from the center 9L of the main-beam light-receiving unit 9M to second division line 9K.

FIG. 17A is a plan view showing the divisional light-receiving elements and an interference fringe by interlayer stray light in an example for comparison; FIG. 17B is a plan view showing the divisional light-receiving elements and an interference fringe by interlayer stray light in another example for comparison; and FIG. 17C is a plan view showing the divisional light-receiving elements and an interference fringe by interlayer stray light in the second embodiment. FIG. 17A shows a case that the center of a sub-beam light-receiving unit (division line) is disposed at a position where the intensity of the interference fringe is the strongest, FIG. 17B shows a case that the center of a sub-beam light-receiving unit (division line) is disposed at a position where the intensity of the interference fringe is the weakest, and FIG. 17C shows a case that the center of the sub-beam light-receiving unit (division line) is disposed at a position where the intensity of the interference fringe is intermediate.

In FIG. 17A showing the example for comparison, it is configured so as to satisfy $V_{c1}=T_y\times N_2$, where $V_{c1}$ denotes a distance from the center 9L of the main-beam light-receiving unit 9M to the first division line and a distance from the center 9L of the main-beam light-receiving unit 9M to the second division line.

Furthermore, in FIG. 17B showing the other example for comparison, it is configured so as to satisfy $V_{c2}=T_y\times(N_2-1/2)$, where $V_{c1}$ denotes distance from the center 9L of the main-beam light-receiving unit 9M to the first division line and a distance from the center 9L of the main-beam light-receiving unit 9M to the second division line.

Further, in FIG. 17C showing the second embodiment, it is configured so as to satisfy $V_y=(T_y/2)\times\{N_2-(1/2)\}$, where $V_y$ denotes a distance from the center 9L of the main-beam light-receiving unit 9M to the first division line and a distance from the center 9L of the main-beam light-receiving unit 9M to the second division line.

FIG. 18A, FIG. 18B, and FIG. 18C are diagrams showing influence of the interference fringe by the interlayer stray light on a sub-beam push-pull signal, in the optical head apparatus which has the photodetector of FIG. 17A, according to the example for comparison. FIG. 18A, FIG. 18B, and FIG. 18C show, in a case that the division line being the center of the sub-beam light-receiving unit for detecting a sub beam is disposed at a position where the intensity of the interference fringe is the strongest, how the interference fringe shifts on the divisional light-receiving elements 9e and 9f of the sub-beam light-receiving unit, how the interference fringe shifts on the divisional light-receiving elements 9g and 9h of the sub-beam light-receiving unit, and a signal Vef=(E−F), a signal Vgh=(G−H), a signal Vefgh={(E−F)+(G−H)} being determined from calculations on signals E, F, G, and H which are detected by the divisional light-receiving elements 9e, 9f, 9g, and 9h. In consequence of the shift of the interference fringe, the signal Vef=(E−F) and the signal Vgh=(G−H) change, as well as the signal Vefgh={(E−F)+(G−H)} which is the sum of these signals.

FIG. 19A, FIG. 19B, and FIG. 19C are diagrams showing influence of the interference fringe by the interlayer stray light on a sub-beam push-pull signal in the optical head apparatus which has the photodetector of FIG. 17B, according to the other example for comparison. FIG. 19A, FIG. 19B, and FIG. 19C show, in a case that the division line being the center of the sub-beam light-receiving unit for detecting a sub beam is disposed at a position where the intensity of the interference fringe is the weakest, how the interference fringe shifts on the divisional light-receiving elements 9e and 9f of the sub-beam light-receiving unit, how the interference fringe shifts on the divisional light-receiving elements 9g and 9h of the sub-beam light-receiving unit, and a signal Vef=(E−F), a signal Vgh=(G−H), a signal Vefgh={(E−F)+(G−H)} being determined from calculations on signals E, F, G, and H which are detected by the divisional light-receiving elements 9e, 9f, 9g, and 9h. In consequence of the shift of the interference fringe, the signal Vef=(E−F) and the signal Vgh=(G−H) change, as well as the signal Vefgh={(E−F)+(G−H)} which is the sum of these signals.

Figure 20A:
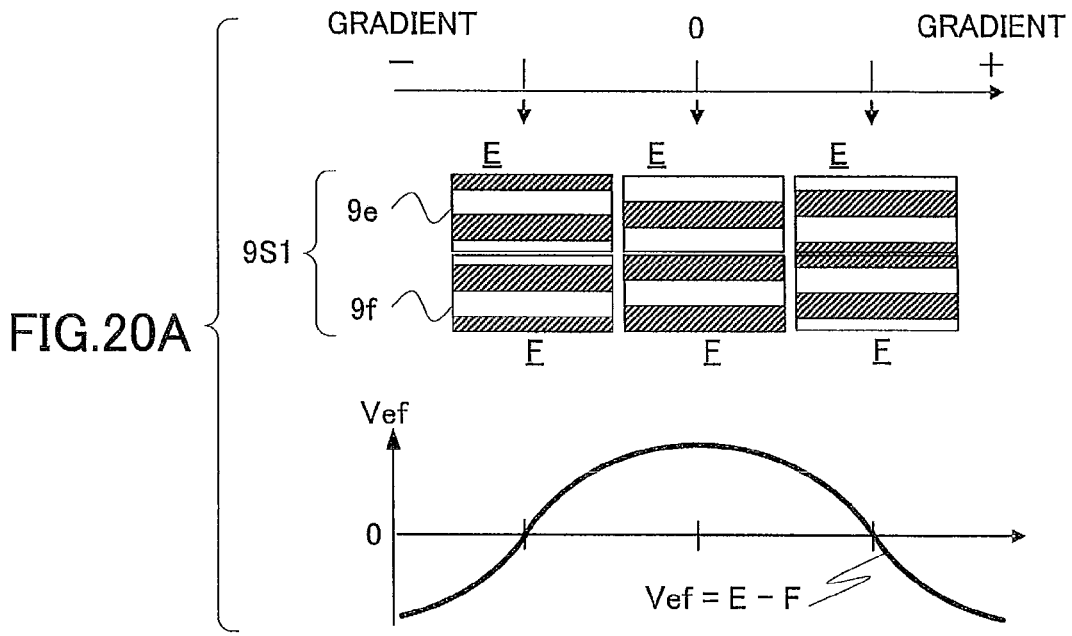
FIG. 20A, FIG. 20B, and FIG. 20C are diagrams showing that an interference fringe by interlayer stray light has no influence on a sub-beam push-pull signal in the optical head apparatus according to the second embodiment.
Figure 20B:
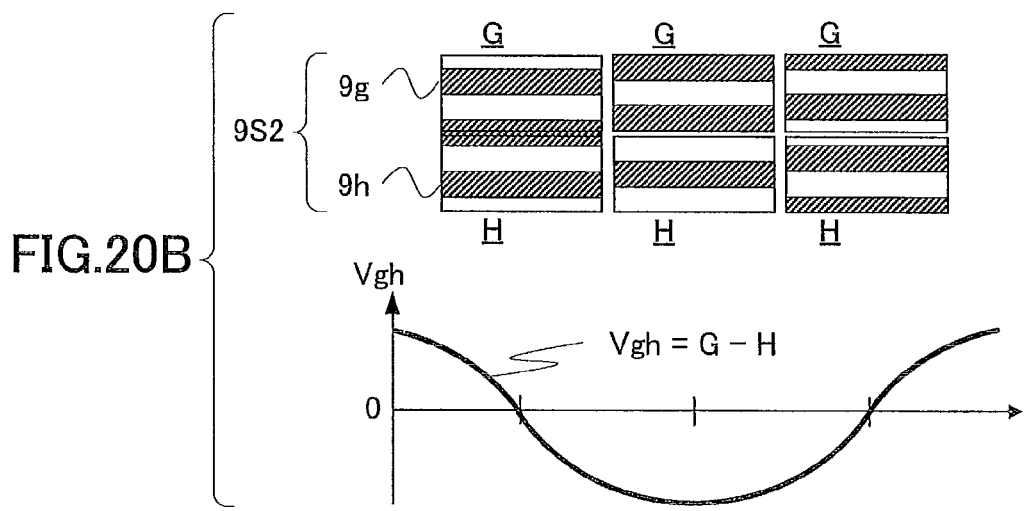
Figure 20C:
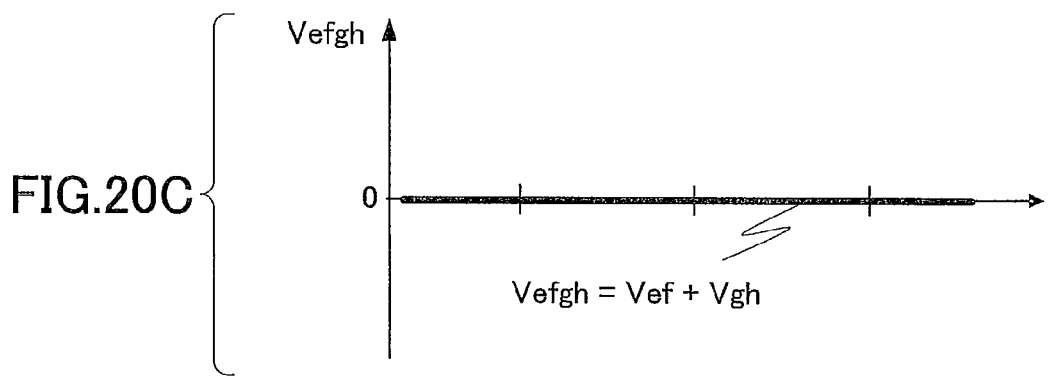

FIG. 20A, FIG. 20B, and FIG. 20C are diagrams showing that an interference fringe by the interlayer stray light has no influence on a sub-beam push-pull signal in the optical head apparatus according to the second embodiment. FIG. 20A, FIG. 20B, and FIG. 20C show, in a case that the division line being the center of the sub-beam light-receiving unit is disposed at a position where the intensity of the interference fringe is intermediate, how the interference fringe shifts on the sub-beam light-receiving units 9e and 9f, how the interference fringe shifts on the sub-beam light-receiving units 9g and 9h, and a signal Vef=(E−F), a signal Vgh=(G−H), and a signal Vefgh={(E−F)+(G−H)} being determined from calculations on signals E, F, G, and H detected by the divisional light-receiving elements 9e, 9f, 9g, and 9h. In consequence of the shift of the interference fringe, the signal Vef=(E−F) and the signal Vgh=(G−H) change, however, the signal Vgh=(G−H) changes out of phase by 180 degrees with the signal Vef=(E−F) and accordingly the signal Vefgh={(E−F)+(G−H)} which is the sum of these signals becomes zero by canceling with each other.

Thus, according to the second embodiment, the division line dividing the sub-beam light-receiving unit 9S1 into the divisional light-receiving element 9e and the divisional light-receiving element 9f is disposed at a position where the intensity of the interference fringe is intermediate between the strongest position and the weakest position of intensity and the division line dividing the sub-beam light-receiving unit 9S2 into the divisional light-receiving element 9g and the divisional light-receiving element 9h is disposed at a position where the intensity of the interference fringe is intermediate between the strongest position and the weakest position of intensity. Such arrangement makes it possible to reduce a phenomenon that the interlayer stray light causes a differential push-pull signal inaccurate. Thereby, accuracy of tracking control can be improved without making a configuration of the apparatus complicated.

Furthermore, according to a variation example of the present invention in which both modes of the first embodiment and the second embodiment are used, accuracy of tracking control can be further improved.

What is claimed is:

1. An optical head apparatus irradiating a multi-layer optical disc having a plurality of information recording surfaces with laser light and detecting reflected light of the laser light, the optical head apparatus comprising:
   a laser light source;
   a diffraction means splitting laser light which is emitted from the laser light source into zero-order diffracted light, positive-first-order diffracted light, and negative-first-order diffracted light;
   a photodetector; and
   an optical system means collecting the zero-order diffracted light, the positive-first-order diffracted light, and the negative-first-order diffracted light, on an access-target information recording surface out of the plurality of information recording surfaces, and guiding on the photodetector, reflected light of the zero-order diffracted light, reflected light of the positive-first-order diffracted light, and reflected light of the negative-first-order diffracted light by the access-target information recording surface; wherein:
   the optical system means includes an adjusting means moving a light-collected position of the zero-order diffracted light, the positive-first-order diffracted light, and the negative-first-order diffracted light, in a focus direction and a tracking direction;
   the photodetector includes
   a main-beam light-receiving unit which is disposed at a position where the reflected light of the zero-order diffracted light by the access-target information recording surface is received,
   a first sub-beam light-receiving unit which is disposed at a position where the reflected light of the positive-first-order diffracted light by the access-target information recording surface is received, and
   a second sub-beam light-receiving unit which is disposed at a position where the reflected light of the negative-first-order diffracted light by the access-target information recording surface is received;
   the first sub-beam light-receiving unit is divided by a first division line in an x-direction being a direction on the photodetector corresponding to a tangential direction of a recording track on the optical disc, and includes a first divisional light-receiving element and a second divisional light-receiving element which are arranged in a y-direction being orthogonal to the x-direction;
   the second sub-beam light-receiving unit is divided by a second division line in the x-direction, and includes a third divisional light-receiving element and a fourth divisional light-receiving element which are arranged in the y-direction;

$U_y = T_y \times N_1$ is satisfied, where $T_y$ denotes a length in the y-direction of one period of an interference fringe which is formed on the photodetector by reflected light of the zero-order diffracted light by an information recording surface other than the access-target information recording surface, reflected light of the positive-first-order diffracted light by the information recording surface other than the access-target information recording surface, and reflected light of the negative-first-order diffracted light by the information recording surface other than the access-target information recording surface,
$N_1$ denotes a positive integer, and
$U_y$ denotes each length in the y-direction of the first divisional light-receiving element, the second divisional light-receiving element, the third divisional light-receiving element, and the fourth divisional light-receiving element.

2. The optical head apparatus according to claim 1, wherein $V_y = (T_y/2) \times \{N_2 - (1/2)\}$ is satisfied, where $N_2$ denotes a positive integer, and
$V_y$ denotes a distance from a center of the main-beam light-receiving unit to the first division line and a distance from a center of the main-beam light-receiving unit to the second division line.

3. The optical head apparatus according to claim 1, wherein the plurality of the information recording surfaces are two information recording surfaces.

4. The optical head apparatus according to claim 1, wherein the main-beam light-receiving unit has four divisional light-receiving elements by equally dividing in four sections by a division line in the x-direction and a division line in the y-direction.

5. An optical disc apparatus comprising:
   the optical head apparatus according to claim 1;
   a matrix circuit producing a focus error signal and a tracking error signal from a detection signal which are output from the photodetector of the optical head apparatus; and
   a servo circuit controlling the adjusting means of the optical head apparatus according to a push-pull method using the focus error signal and the tracking error signal.

6. An optical head apparatus irradiating a multi-layer optical disc having a plurality of information recording surfaces with laser light and detecting reflected light of the laser light, comprising:
   a laser light source;
   a diffraction means splitting laser light which is emitted from the laser light source into zero-order diffracted light, positive-first-order diffracted light, and negative-first-order diffracted light;
   a photodetector; and
   an optical system means collecting the zero-order diffracted light, the positive-first-order diffracted light, and the negative-first-order diffracted light, on an access-target information recording surface out of the plurality of information recording surfaces, and guiding reflected light of the zero-order diffracted light, reflected light of the positive-first-order diffracted light, and reflected light of the negative-first-order diffracted light by the access-target information recording surface, on the photodetector; wherein:
   the optical system means includes an adjusting means moving a light-collected position of the zero-order diffracted light, the positive-first-order diffracted light, and the negative-first-order diffracted light, in a focus direction and a tracking direction;

the photodetector includes a main-beam light-receiving unit which is disposed at a position where the reflected light of the zero-order diffracted light by the access-target information recording surface is received;

a first sub-beam light-receiving unit which is disposed at a position where the reflected light of the positive-first-order diffracted light by the access-target information recording surface is received; and a second sub-beam light-receiving unit which is disposed at a position where the reflected light of the negative-first-order diffracted light by the access-target information recording surface is received;

the first sub-beam light-receiving unit is divided by a first division line in an x-direction being a direction on the photodetector corresponding to a tangential direction of a recording track on the optical disc, and includes a first divisional light-receiving element and a second divisional light-receiving element which are arranged in a y-direction being orthogonal to the x-direction;

the second sub-beam light-receiving unit is divided by a second division line in the x-direction, and includes a third divisional light-receiving element and a fourth divisional light-receiving element which are arranged in the y-direction;

$V_y = (T_y/2 \times N_2 - (1/2))$ is satisfied, where $T_y$ denotes a length in the y-direction of one period of an interference fringe which is formed on the photodetector by reflected light of the zero-order diffracted light by an information recording surface other than the access-target information recording surface, reflected light of the positive-first-order diffracted light by the information recording surface other than the access-target information recording surface, and reflected light of the negative-first-order diffracted light by the information recording surface other than the access-target information recording surface, $N_2$ denotes a positive integer, and $V_y$ denotes a distance from a center of a main-beam light-receiving unit to the first division line and a distance from a center of the main-beam light-receiving unit to the second division line.

7. An optical disc apparatus comprising:

the optical head apparatus according to claim 6;

a matrix circuit producing a focus error signal and a tracking error signal from a detection signal which are output from the photodetector of the optical head apparatus; and a servo circuit controlling the adjusting means of the optical head apparatus according to a push-pull method using the focus error signal and the tracking error signal.

* * * * *